(12) United States Patent
Kim et al.

(10) Patent No.: US 9,098,240 B2
(45) Date of Patent: Aug. 4, 2015

(54) MOBILE TERMINAL AND CONTROL METHOD FOR THE MOBILE TERMINAL

(71) Applicant: LG ELECTRONICS INC., Seoul (KR)

(72) Inventors: Meeyoung Kim, Seoul (KR); Wanchang Ryu, Seoul (KR); Sangjun Park, Seoul (KR); Jangmuk Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/226,382

(22) Filed: Mar. 26, 2014

(65) Prior Publication Data

US 2015/0009125 A1 Jan. 8, 2015

(30) Foreign Application Priority Data

Jul. 4, 2013 (KR) .......................... 10-2013-0078491
Jul. 23, 2013 (KR) .......................... 10-2013-0086957

(51) Int. Cl.
*G06F 3/0488* (2013.01)
*G06F 1/16* (2006.01)
*G06F 3/048* (2013.01)
*G06F 3/0483* (2013.01)

(52) U.S. Cl.
CPC .............. *G06F 1/1652* (2013.01); *G06F 3/048* (2013.01); *G06F 3/0483* (2013.01); *G06F 3/0488* (2013.01)

(58) Field of Classification Search
CPC ...................................................... G06F 1/1652
See application file for complete search history.

(56) References Cited

U.S. PATENT DOCUMENTS

2012/0115422 A1* 5/2012 Tziortzis et al. ................ 455/73
2013/0300682 A1* 11/2013 Choi et al. ..................... 345/173

* cited by examiner

*Primary Examiner* — Gerald Johnson
(74) *Attorney, Agent, or Firm* — Lee, Hong, Degerman, Kang & Waimey

(57) ABSTRACT

A mobile terminal and corresponding method, the mobile terminal including a flexible display configured to be warped between configurations having different radiuses of curvature, a sensor configured to sense the warpage, and a controller configured to display first screen information in a first configuration, and display a first image object corresponding to the first screen information when the flexible display is warped from the first configuration to a second configuration. When a different application is driven, a second image object corresponding to the different application is displayed along with the first image object, in the second configuration, and when the flexible display is warped again from the second configuration to the first configuration, screen information corresponding to part of the first image object and the second image object is displayed.

35 Claims, 24 Drawing Sheets

FIG. 4A
(a) 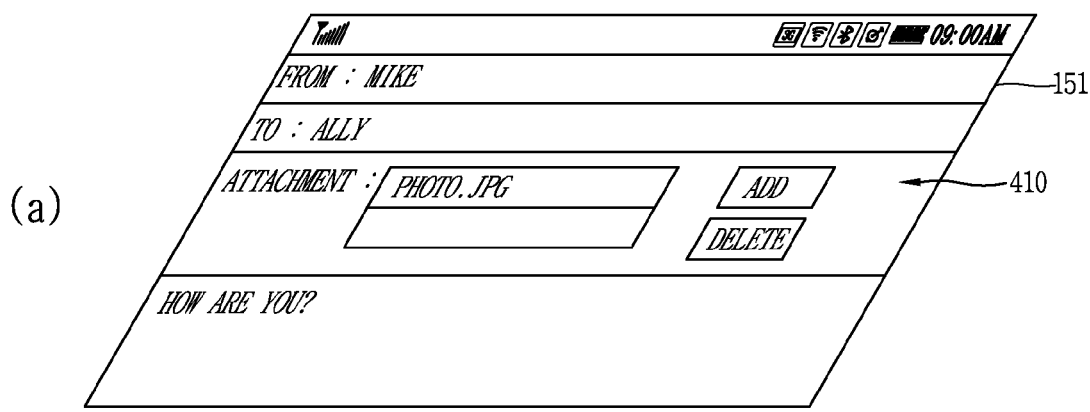
(b) 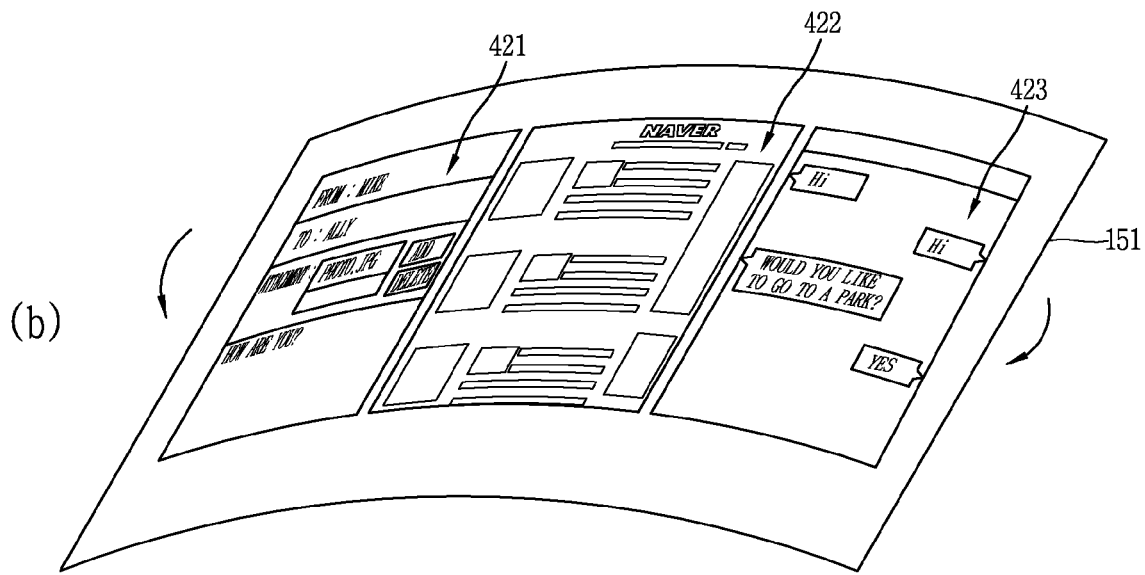

FIG. 4B
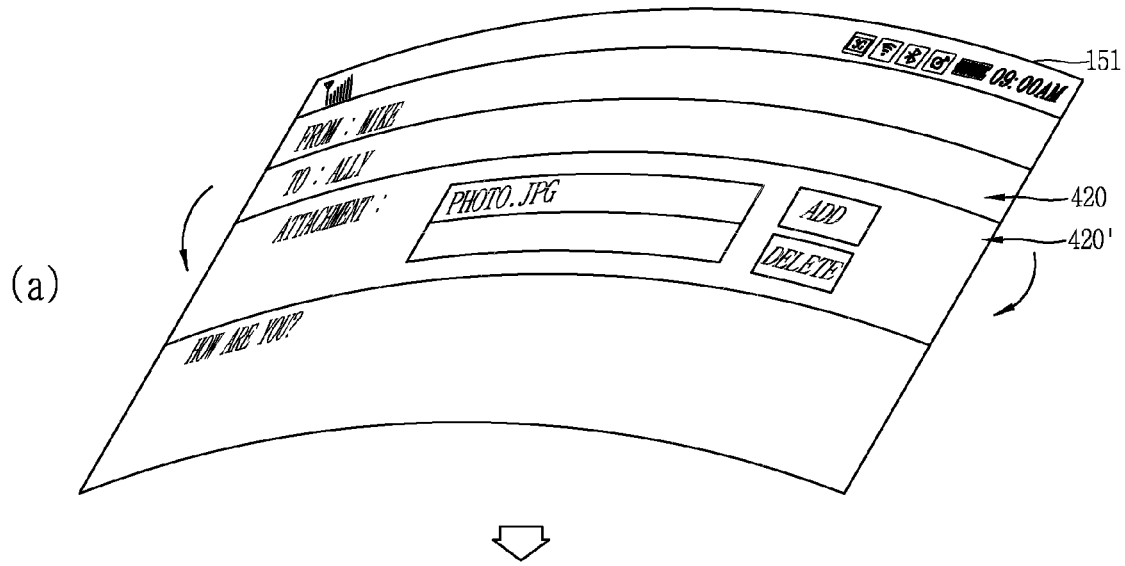
(a)
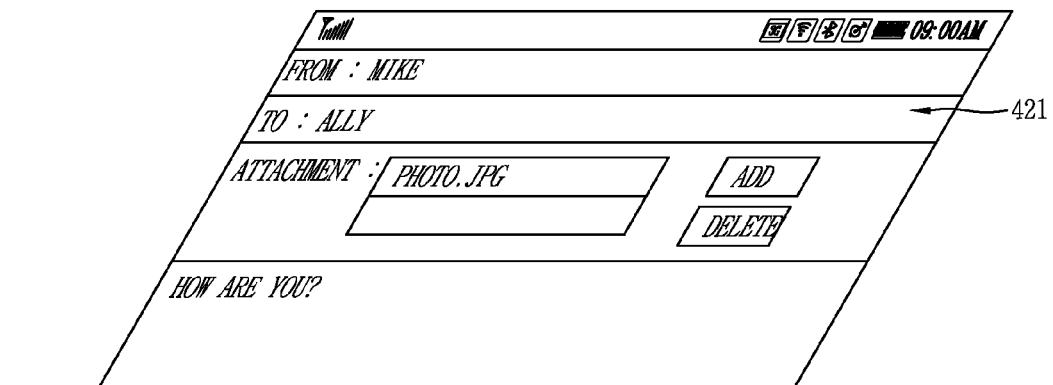
(b)
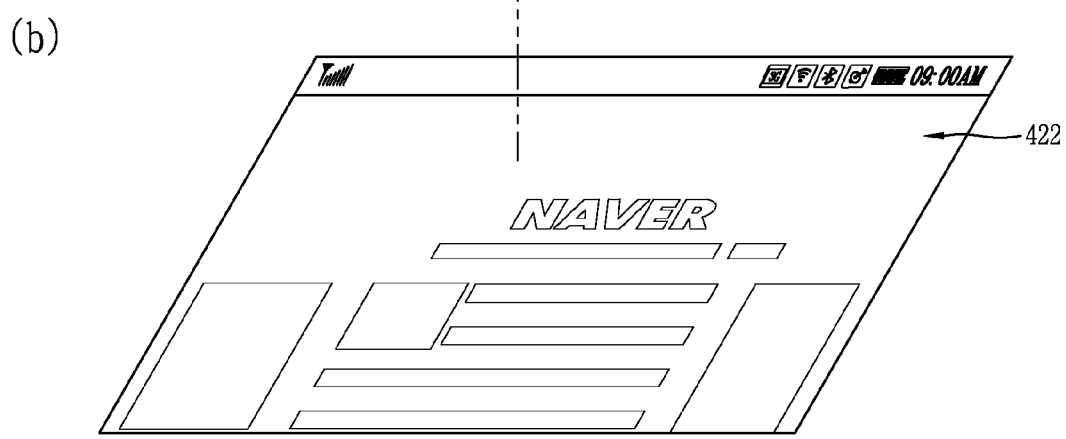

FIG. 4C
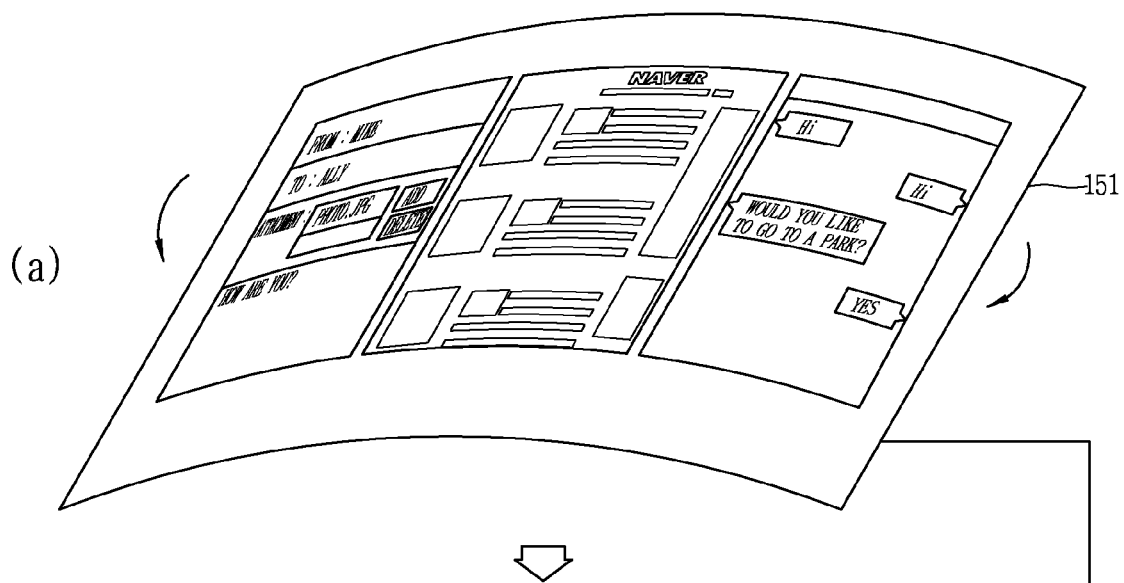
(a)
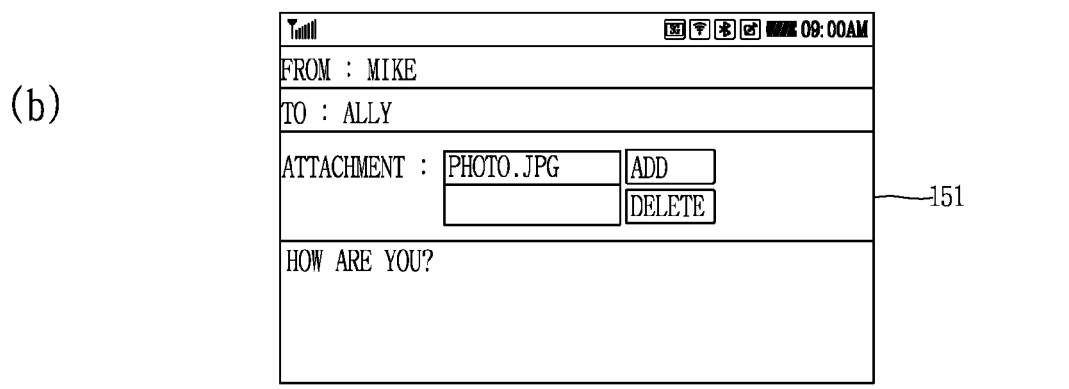
(b)
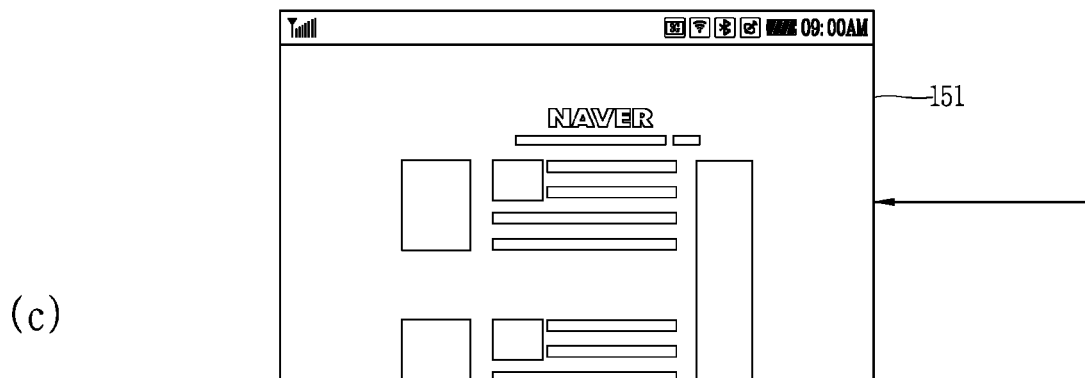
(c)

FIG. 5C
(a) 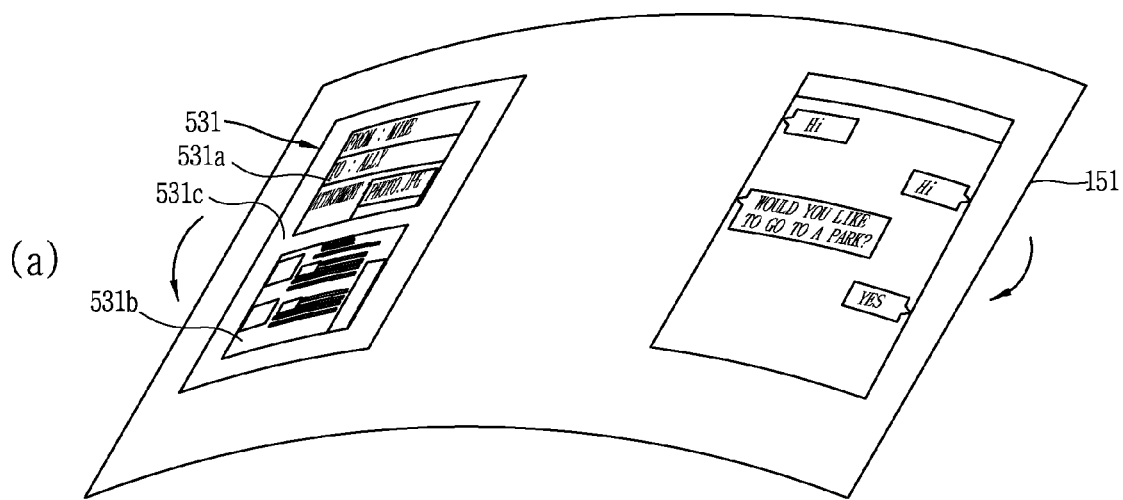
(b) 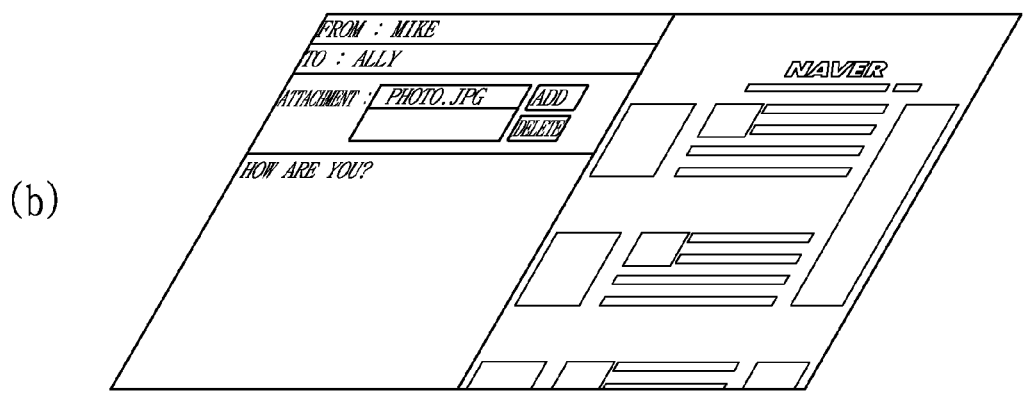
(c) 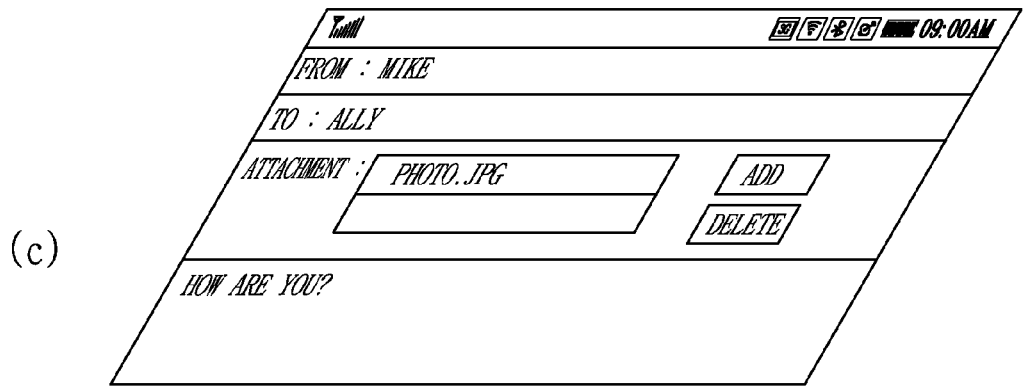

FIG. 6A
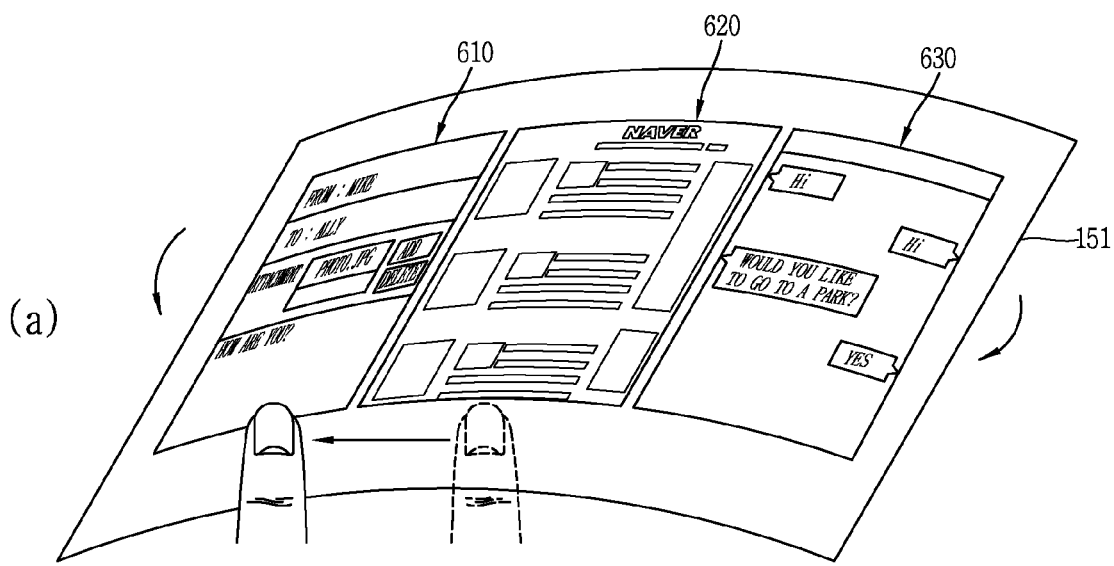
(a)
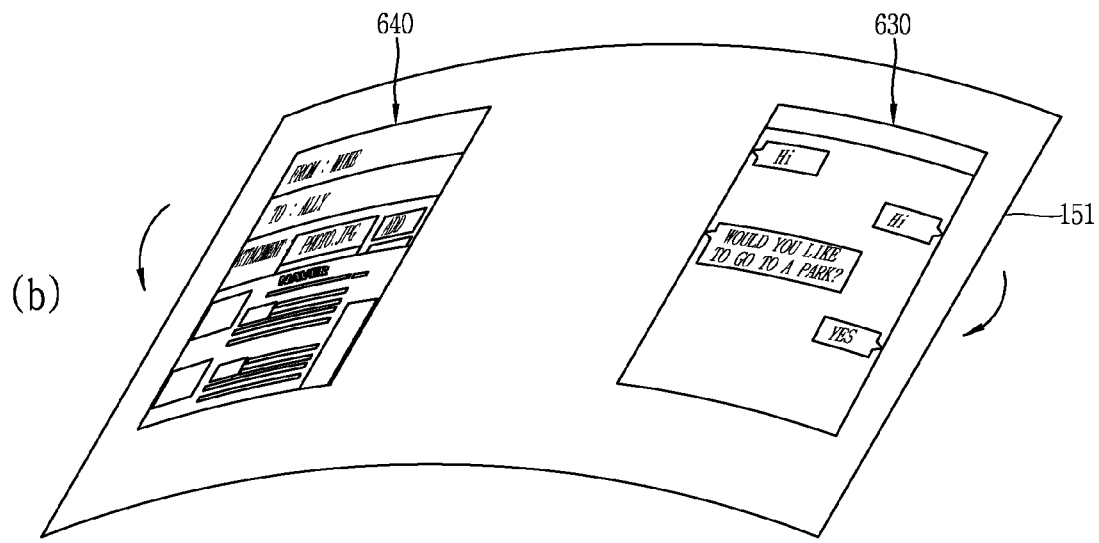
(b)

FIG. 7B
(a) 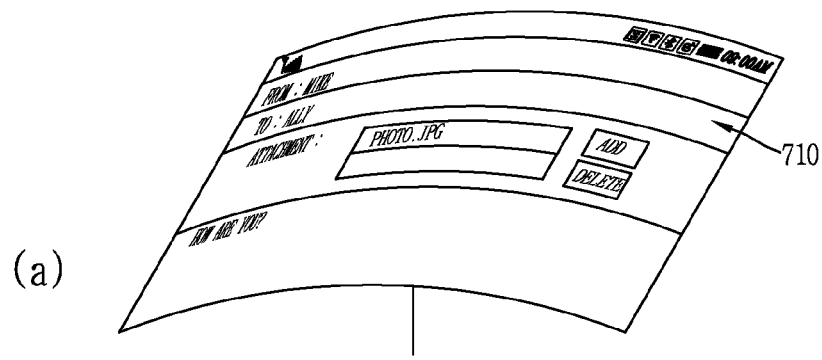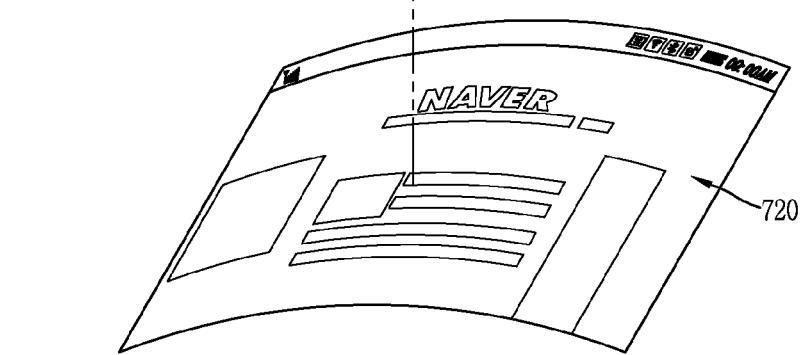
(b) 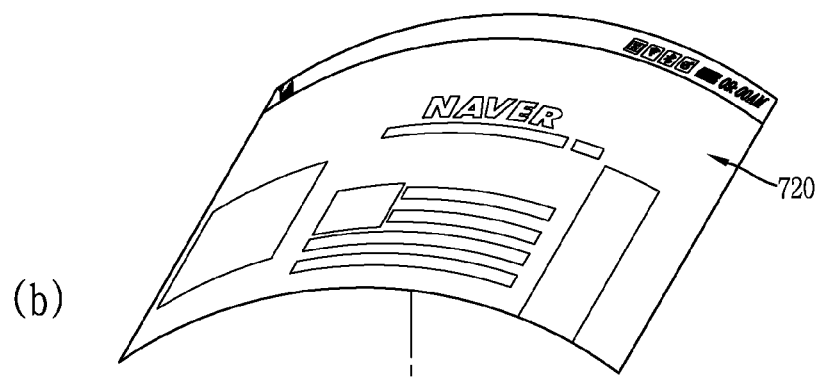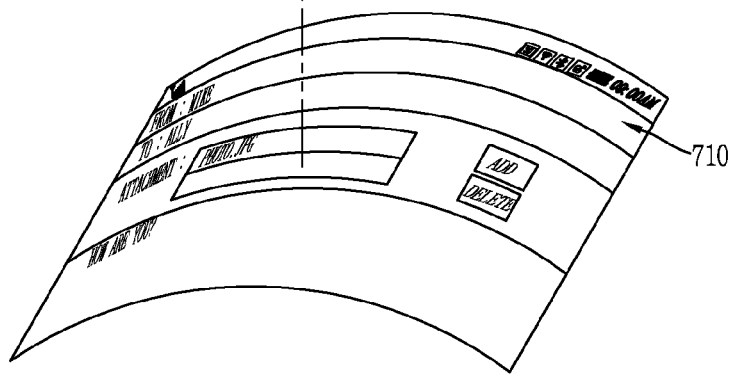

FIG. 9
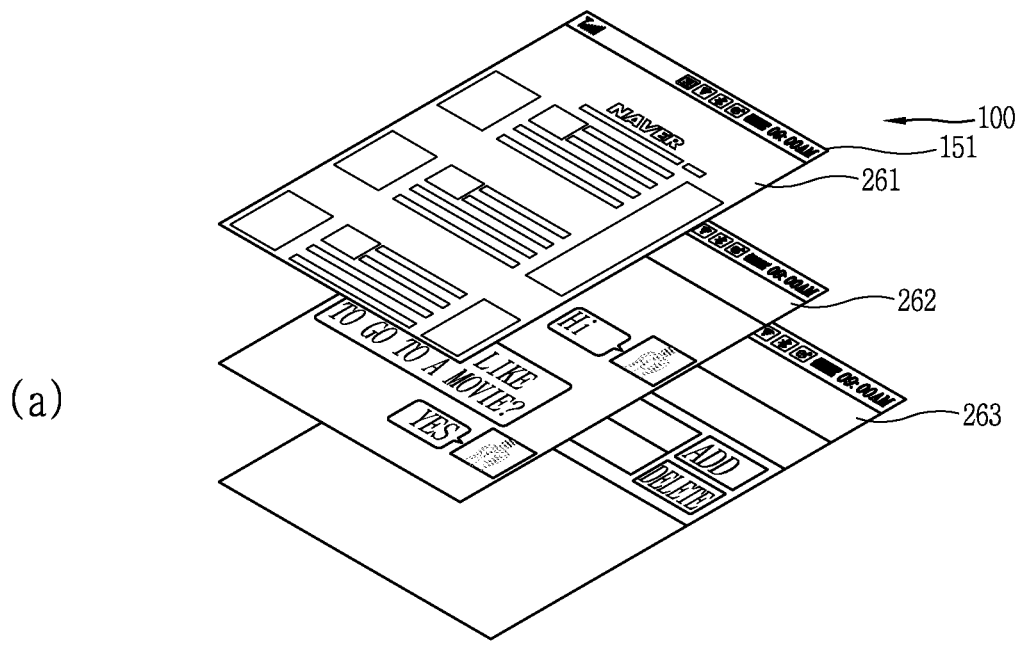
(a)
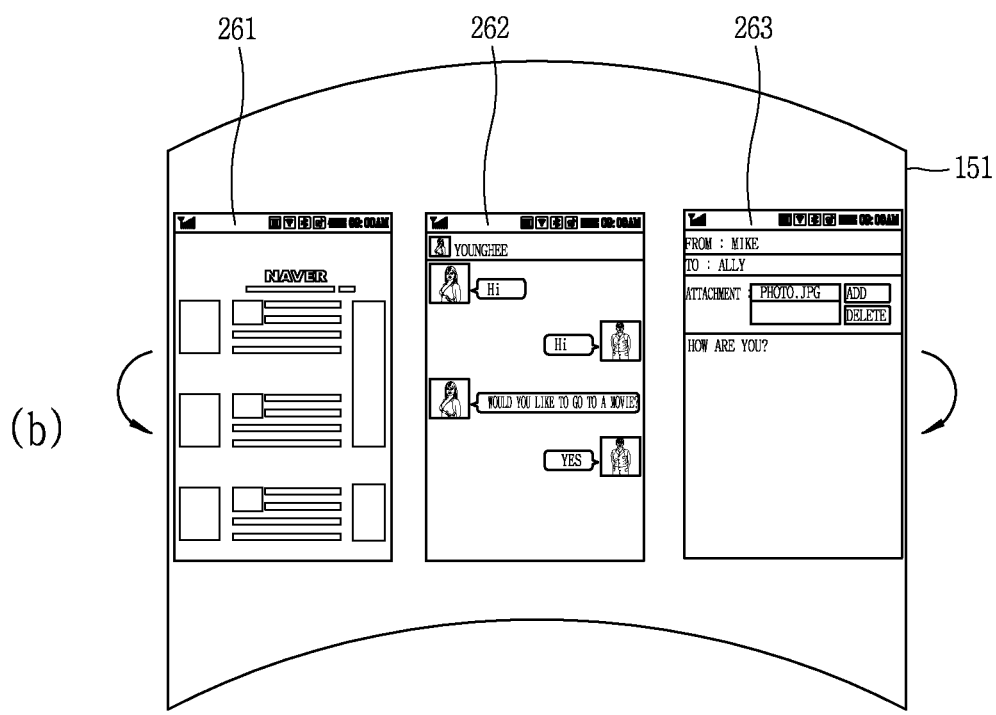
(b)

FIG. 14
(a)
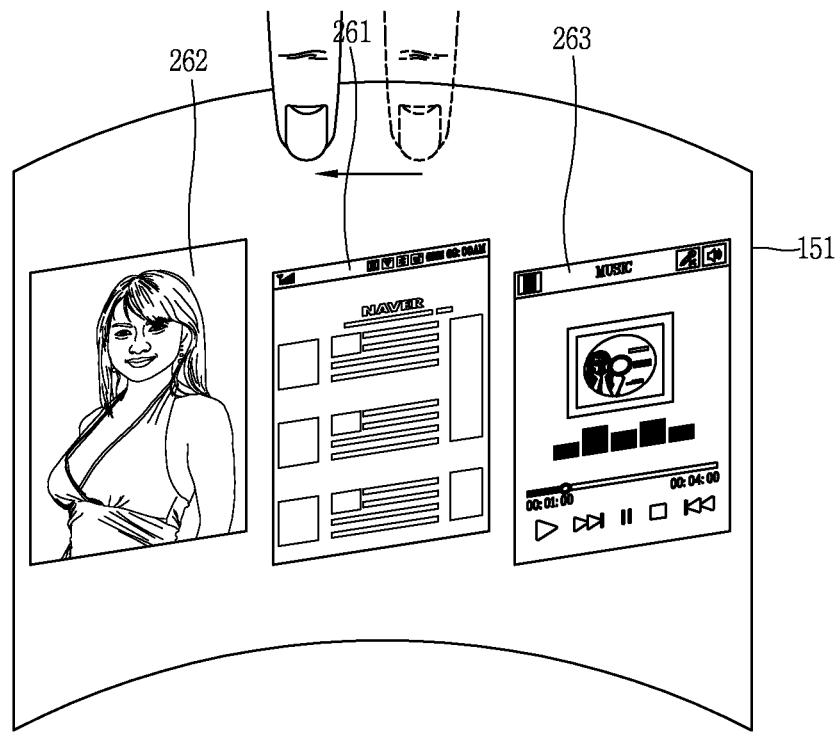
(b)
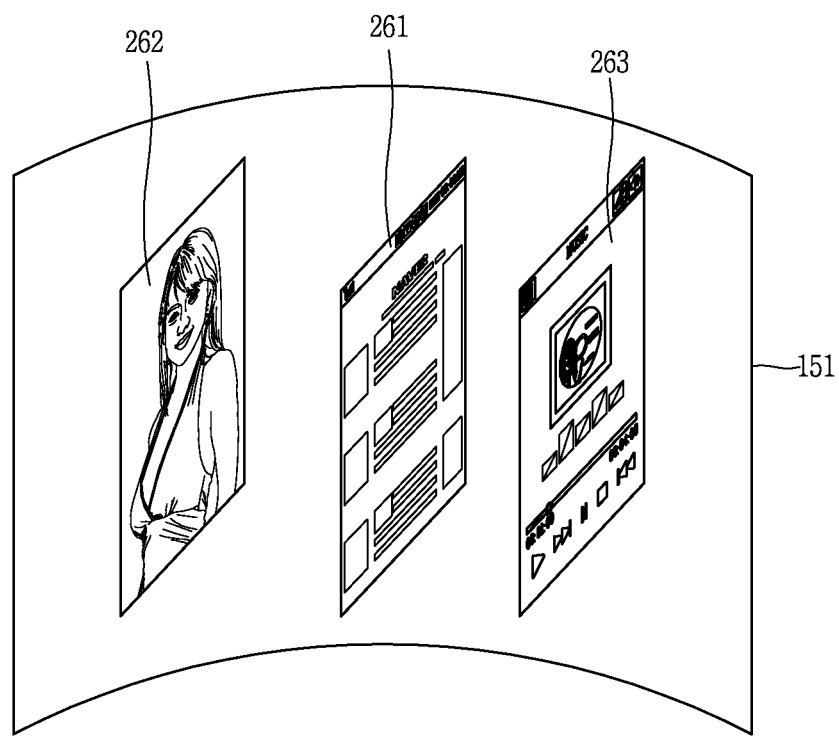

FIG. 17
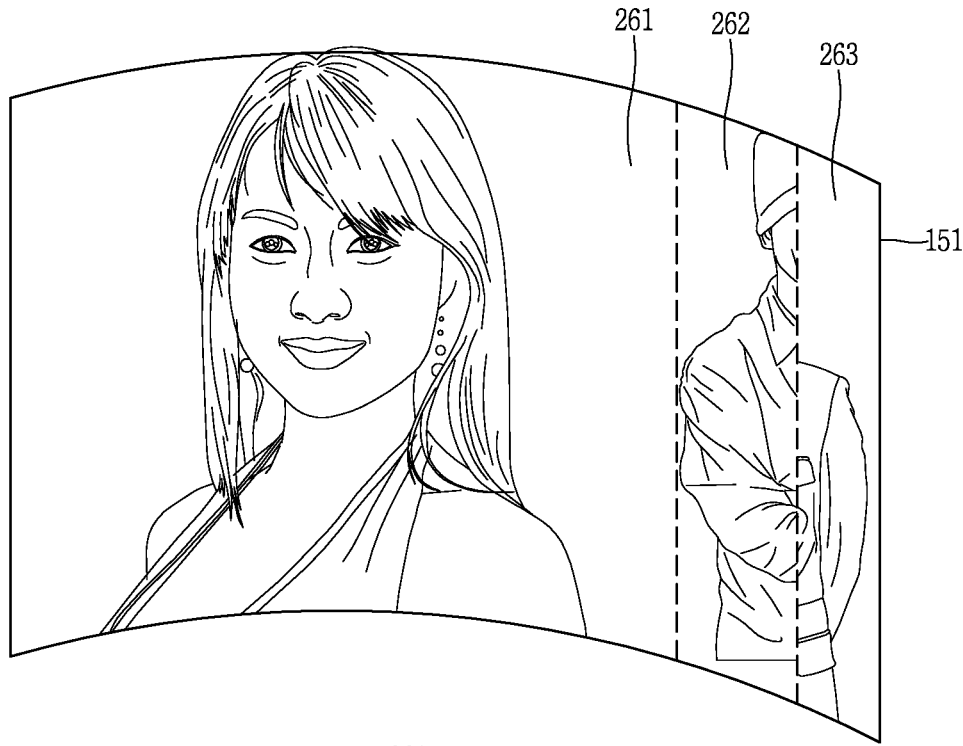
(a)
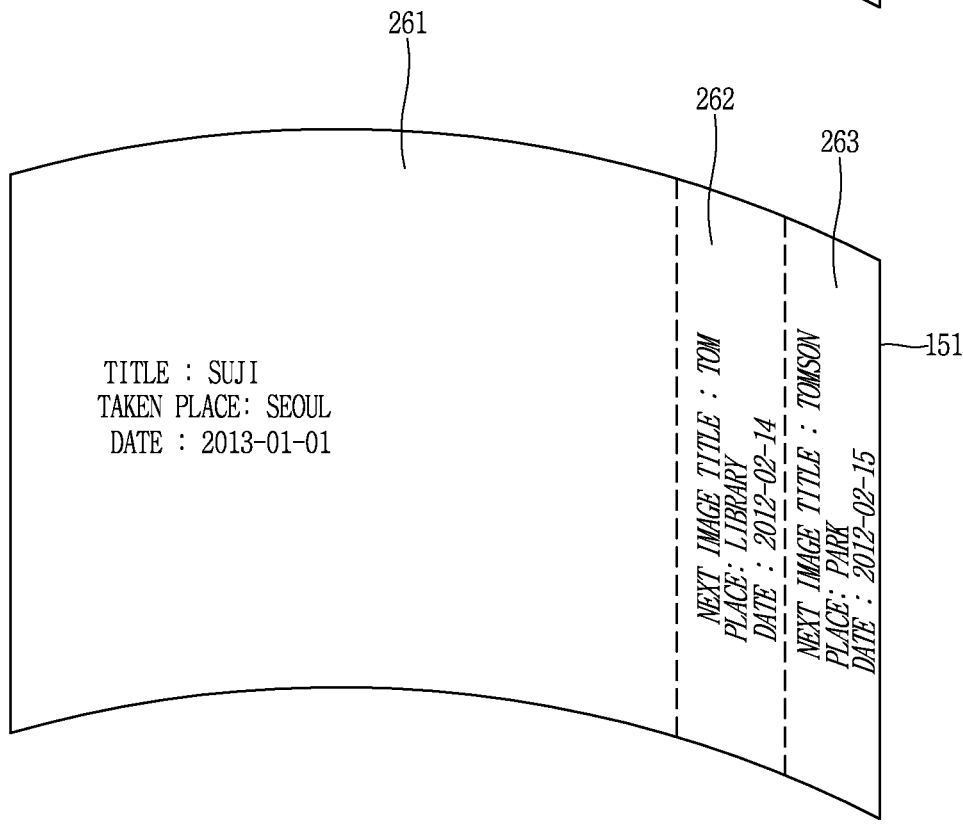
(b)

FIG. 18
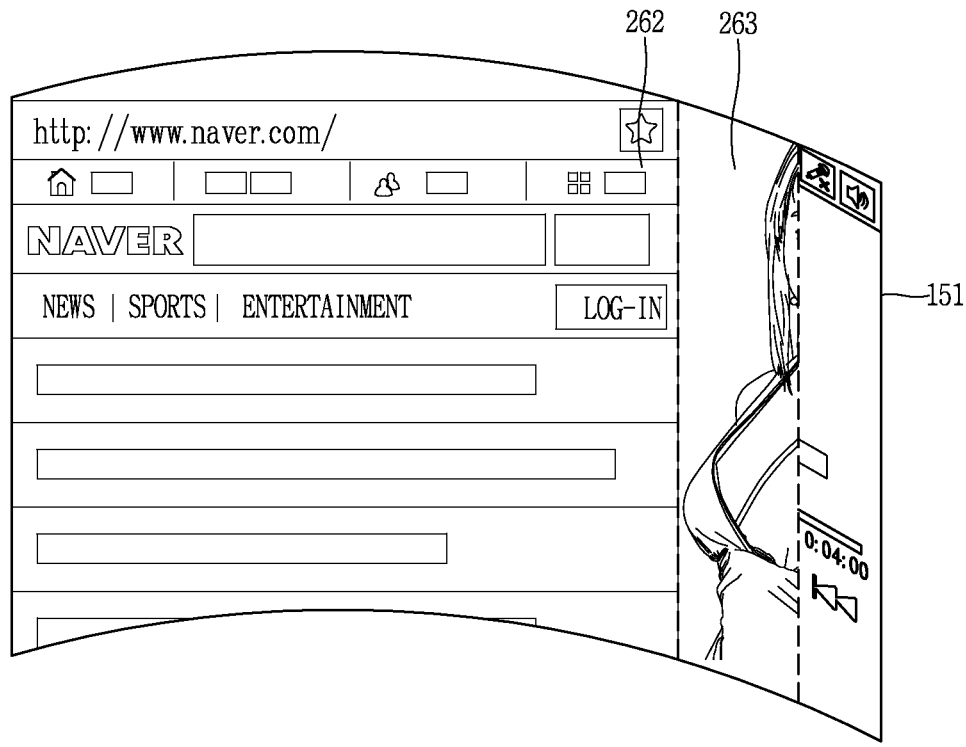
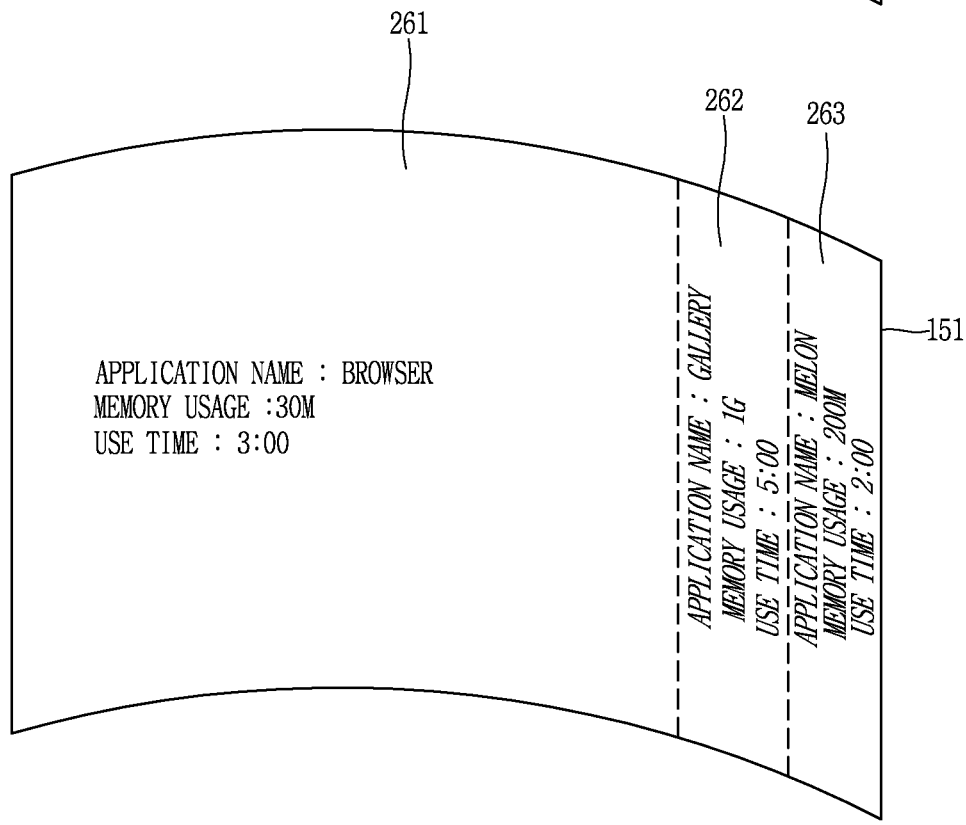

MOBILE TERMINAL AND CONTROL METHOD FOR THE MOBILE TERMINAL

CROSS REFERENCE TO RELATED APPLICATIONS

Pursuant to 35 U.S.C. §119(a), this application claims the benefit of earlier filing date and right of priority to Korean Application Nos. 10-2013-0078491, filed on Jul. 4, 2013, and 10-2013-0086957, filed on Jul. 23, 2013, the contents of which are all hereby incorporated by reference herein in their entirety.

BACKGROUND OF THE INVENTION

1. Field of the Invention

The present disclosure relates to a mobile terminal including a flexible display unit.

2. Description of the Related Art

Terminals may be divided into mobile/portable terminals and stationary terminals according to their mobility. Also, mobile terminals may be classified into handheld terminals and vehicle mount terminals according to whether or not a user can directly carry the mobile terminal.

A multifunctional mobile terminal may be configured to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In general, mobile terminals have evolved with various forms of design. For example, flexible displays have attracted attention due to their light and non-fragile characteristics. Flexible displays allow for the creation of new user interfaces for which applications associated with glass substrate based displays in the related art have been limited or disabled. Thus, the need for a new input scheme using the characteristics of a flexible display has been widely acknowledged

SUMMARY OF THE INVENTION

An aspect of the present disclosure is a mobile terminal capable of entering a control command using the warpage or bending of a flexible display unit, and a control method thereof.

Another aspect of the present disclosure is a mobile terminal for performing control associated with different applications using the warpage or bending of a flexible display unit, and a control method thereof.

In order to accomplish the foregoing objective, a mobile terminal according to an embodiment of the present disclosure may include a flexible display unit configured to be warped by an external force between a first configuration and a second configuration having different radiuses of curvature, a sensing unit configured to sense the warpage of the flexible display unit, and a controller configured to display first screen information in the first configuration, and display a first image object corresponding to the first screen information when the flexible display unit is warped from the first configuration to the second configuration, wherein when an application different from an application corresponding to the first screen information is driven, a second image object corresponding to the different application is displayed along with the first image object, in the second configuration, and when the flexible display unit is warped again from the second configuration to the first configuration, screen information corresponding to at least part of the first image object and the second image object is displayed.

According to an embodiment, the first screen information may be screen information contained in a first layer, and the second image object may correspond to second screen information contained in a second layer different from the first layer, and the first and the second screen information may be formed of the execution screens of applications.

According to an embodiment, when a plurality of applications are driven on the first layer, screen information contained in the first layer may include execution screens corresponding to the plurality of applications, respectively, and when the degree of warpage of the flexible display unit is out of a reference range in the second configuration, the controller may drive a plurality of applications driven on the first layer on different layers.

According to an embodiment, when two applications are driven on the first layer, the controller may drive either one of the plurality of applications on the first layer based on the degree of warpage of the flexible display unit being out of the reference range, and drive the other one of the plurality of applications on a third layer different from the first and the second layer.

According to an embodiment, a third image object corresponding to the third layer may be further displayed along with the first and the second image object on the flexible display unit.

According to an embodiment, when the third image object is selected in a state that the first, the second and the third image object are displayed, the screen information of a third layer corresponding to the third image object may be displayed on the flexible display unit.

According to an embodiment, when the degree of warpage of the flexible display unit is out of the reference range and then restored within the reference range, the third layer may disappear and the two applications may be driven again on the first layer.

According to an embodiment, when either one of the first and the second image object is moved to the another one based on a touch applied to the flexible display unit, applications corresponding to the first and the second image objects, respectively, may be driven on one layer.

According to an embodiment, a third image object corresponding to the one layer may be displayed instead of the first and the second image object based on the movement.

According to an embodiment, the one layer may be displayed on the flexible display unit in response to the third image object being selected or the flexible display unit being warped again to the first configuration, and the one layer may include the execution screens of applications corresponding to the first and the second image objects, respectively.

According to an embodiment, the first configuration may be a configuration in which the display area of the flexible display unit is a planar surface, and the second configuration may be a configuration in which the display area thereof is a curved surface.

According to an embodiment, when the flexible display unit is warped again to the first configuration based on a touch to either one of the first and the second image object, the controller may display screen information corresponding to an image object applied with the touch.

A mobile terminal according to an embodiment of the present disclosure may include a flexible display unit configured to be warped by an external force between a first configuration and a second configuration having different radiuses of curvature, a sensing unit configured to sense the warpage of the flexible display unit, and a controller configured to display first screen information in the first configuration, and display second screen information along with the first screen information when the flexible display unit is warped from the first configuration to the second configuration, wherein when the flexible display unit is warped again from the second configuration to the first configuration, screen information corresponding to at least part of the first and the second screen information is displayed.

According to an embodiment, the first and the second screen information may be displayed in an overlapped manner, and either one of the first and the second screen information may be formed in an identifiable manner even in a state that the first and the second screen information are overlapped.

According to an embodiment, the first screen information may be screen information contained in a first layer, and the second screen information may be screen information contained in a second layer different from the first layer, and either one of the first and the second layer may be formed to cover the other one.

According to an embodiment, when the degree of warpage of the flexible display unit is out of a reference range in the second configuration, a layer located at an upper end of the first and the second layer may be located at a lower layer thereof.

According to an embodiment, the controller may display screen information corresponding to a layer located at an upper end of the first and the second layer in response to the flexible display unit being warped again from the second configuration to the first configuration.

According to an embodiment, in the second configuration, the flexible display unit may be divided into a plurality of regions to display the first and the second screen information at the same time.

According to an embodiment, the first and the second screen information may be reduced to be displayed in the plurality of regions, respectively.

A method of controlling a mobile terminal including a flexible display unit configured to be warped by an external force between a first configuration and a second configuration having different radiuses of curvature according to an embodiment of the present disclosure may include displaying first screen information in the first configuration, sensing the warpage of the flexible display unit displayed with the first screen information, and displaying a first image object corresponding to the first screen information and at least one image object corresponding to at least one different application, respectively, being multi-tasked along with an application corresponding to the first screen information when the flexible display unit is warped from the first configuration to the second configuration, wherein when the flexible display unit is warped again from the second configuration to the first configuration, screen information corresponding to at least part of the first image object and the at least one image object is displayed.

A mobile terminal according to an embodiment of the present disclosure may include a flexible display unit configured to be warped by an external force between a first configuration and a second configuration having different radiuses of curvature, a sensing unit configured to sense the warpage of the flexible display unit, and a controller configured to display the execution screen of an application on the flexible display unit in the first configuration, and display another execution screen along with the execution screen on the flexible display unit when the flexible display unit is warped from the first configuration to the second configuration.

According to an embodiment, a single execution screen may be displayed in the first configuration, and a plurality of execution screens are displayed in the second configuration. The first configuration may be a configuration in which the display area of the flexible display unit is a planar surface, and the second configuration may be a configuration in which the display area thereof is a curved surface.

According to an embodiment, an execution screen displayed in the first configuration may be formed in parallel to the flexible display unit, and a plurality of execution screens displayed in the second configuration may be formed to be inclined with respect to the flexible display unit. The boundary lines of a plurality of execution screens, respectively, displayed in the second configuration may be separated from one another.

According to an embodiment, the sensing unit may be configured to sense the inclination of the flexible display unit, and the size of the execution screens displayed in the second configuration may be changed when the flexible display unit is inclined in the second configuration. The extent of the size changes in the execution screens may vary according to the degree of inclination of the flexible display unit. The change of the size may be carried out in connection with a change of the degree of inclination of the displayed execution screens.

According to an embodiment, the sensing unit may be configured to sense the inclination of the flexible display unit, and execution screens displayed in the second configuration may be changed to different shapes according to the direction of the inclination when the flexible display unit is inclined in the second configuration.

According to an embodiment, the size of execution screens displayed in the second configuration may be changed when the flexible display unit is inclined in a first direction, and information associated with the execution screen may be displayed on virtual layers in which the execution screens have been displayed in the second configuration when the flexible display unit is inclined in a second direction which is an opposite to the first direction.

According to an embodiment, when a touch input moving in one direction is applied to a plurality of execution screens displayed in the second configuration, information associated with an execution screen applied with the touch input may be displayed on a virtual layer in which the execution screen applied with the input is displayed. The virtual layer may be formed to be inclined with respect to the flexible display unit to change the degree of inclination using the moving direction of the touch input.

According to an embodiment, a single execution screen may be displayed on the flexible display unit in the first configuration, and the flexible display unit may be divided into a plurality of regions to display a plurality of execution screens in the plurality of regions in the second configuration. The plurality of regions may include a central region and an edge region of the flexible display unit, and the execution screen of an application driven in the first configuration may be displayed in the central region, and an execution screen different from the execution screen may be displayed in the edge region. When a touch input moving in one direction is applied to the edge region, information associated with the execution screens may be displayed in at least one of the central region and edge region. A photo image may be displayed in the central region, and an image next to the photo image may be displayed in the edge region.

According to an embodiment, when the flexible display unit is warped from the first configuration to the second configuration, the execution screen of another application may be displayed on the flexible display unit along with the execution screen of the application.

Furthermore, according to the present disclosure, there is provided a mobile terminal including a flexible display unit configured to be warped by an external force between a first configuration and a second configuration having different radiuses of curvature, a sensing unit configured to sense the warpage of the flexible display unit to determine whether or not the status of the flexible display unit corresponds to the first configuration or second configuration, and a controller configured to display visual information on the flexible display unit using a single virtual layer in the first configuration, and partition the flexible display unit using a plurality of virtual layers in the second configuration.

According to an embodiment, the execution screen of an application may be displayed on the single virtual layer in the first configuration, and information associated with another application may be displayed on the plurality of virtual layers along with the execution screen of the application when the flexible display unit is warped from the first configuration to the second configuration.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A, 4B and 4C are conceptual views for explaining the foregoing control method of FIG. 3;

FIGS. 5A, 5B and 5C are conceptual views for explaining a method of controlling screen information when a plurality of applications are driven on one layer in a mobile terminal according to an embodiment of the present disclosure;

FIGS. 6A and 6B are conceptual views for explaining a method of dividing a screen in a mobile terminal according to an embodiment of the present disclosure;

FIGS. 7A and 7B are conceptual views for explaining a method of displaying a plurality of screen information in a mobile terminal according to an embodiment of the present disclosure;

FIG. 9 is a conceptual view for explaining the foregoing control method of FIG. 8;

FIG. 14 is a conceptual view for explaining a control method using the warpage and touch input of a flexible display unit in a mobile terminal according to still another embodiment of the present disclosure;

FIGS. 16 through 18 are conceptual views for explaining a control method using the warpage and touch input of a flexible display unit in a mobile terminal according to still another embodiment of the present disclosure.

DETAILED DESCRIPTION OF THE INVENTION

Figure 1:
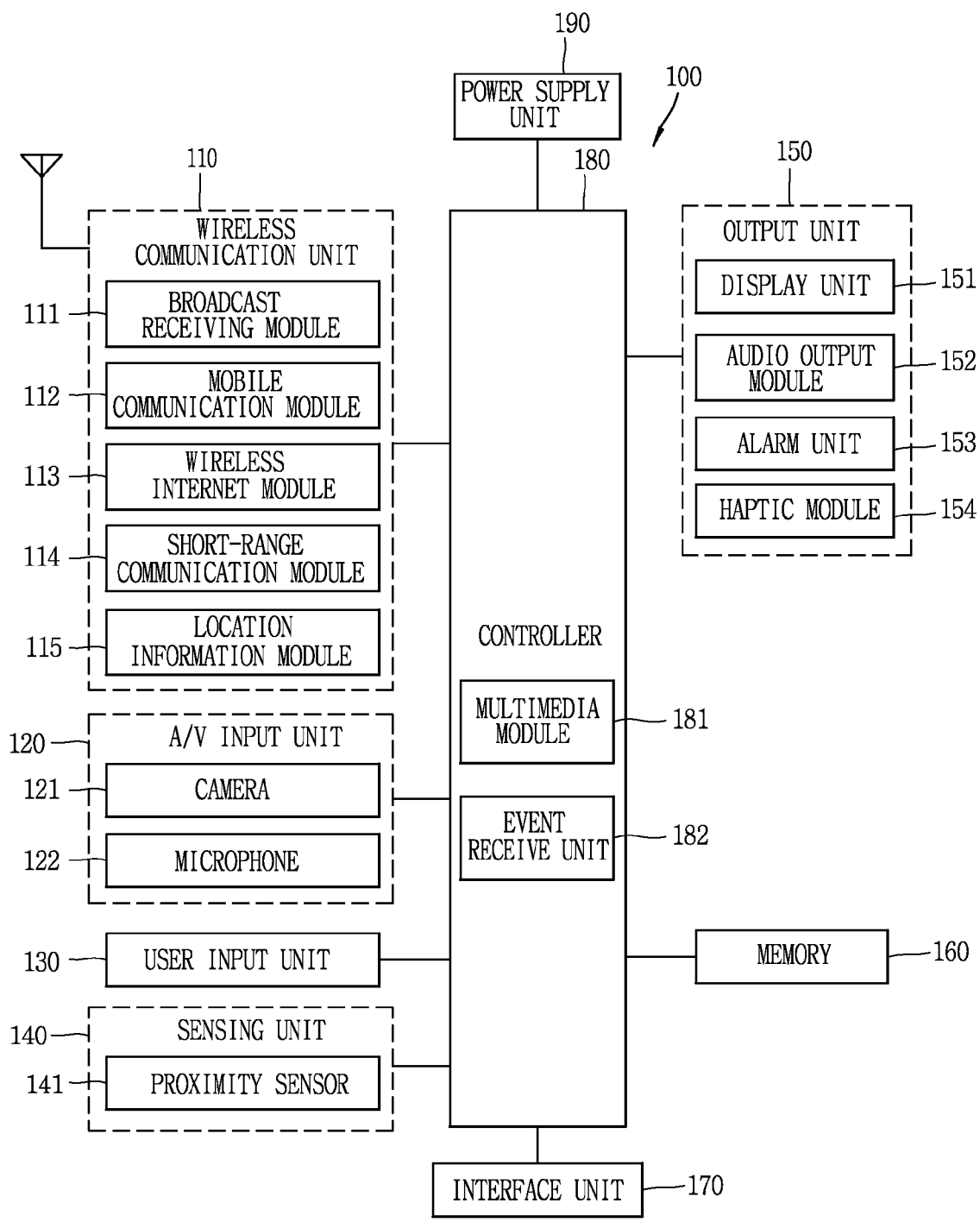
FIG. 1 is a block diagram illustrating a mobile terminal according to an embodiment of the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

A mobile terminal disclosed herein may include a mobile phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (NV) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, and the like.

The location information module 115 is a module for checking or acquiring the location of the mobile terminal, and there is a Global Positioning Module (GPS) module as a representative example.

Referring to FIG. 1, the NV (audio/video) input unit 120 receives an audio or video signal, and the NV (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT- LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure during the touch.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of the pointer to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm 153 outputs signals notifying occurrence of events from the mobile terminal 100. The events occurring from the mobile terminal may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, they 152, 153 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback and an event receive unit 182 that receives event information. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Figure 2A:
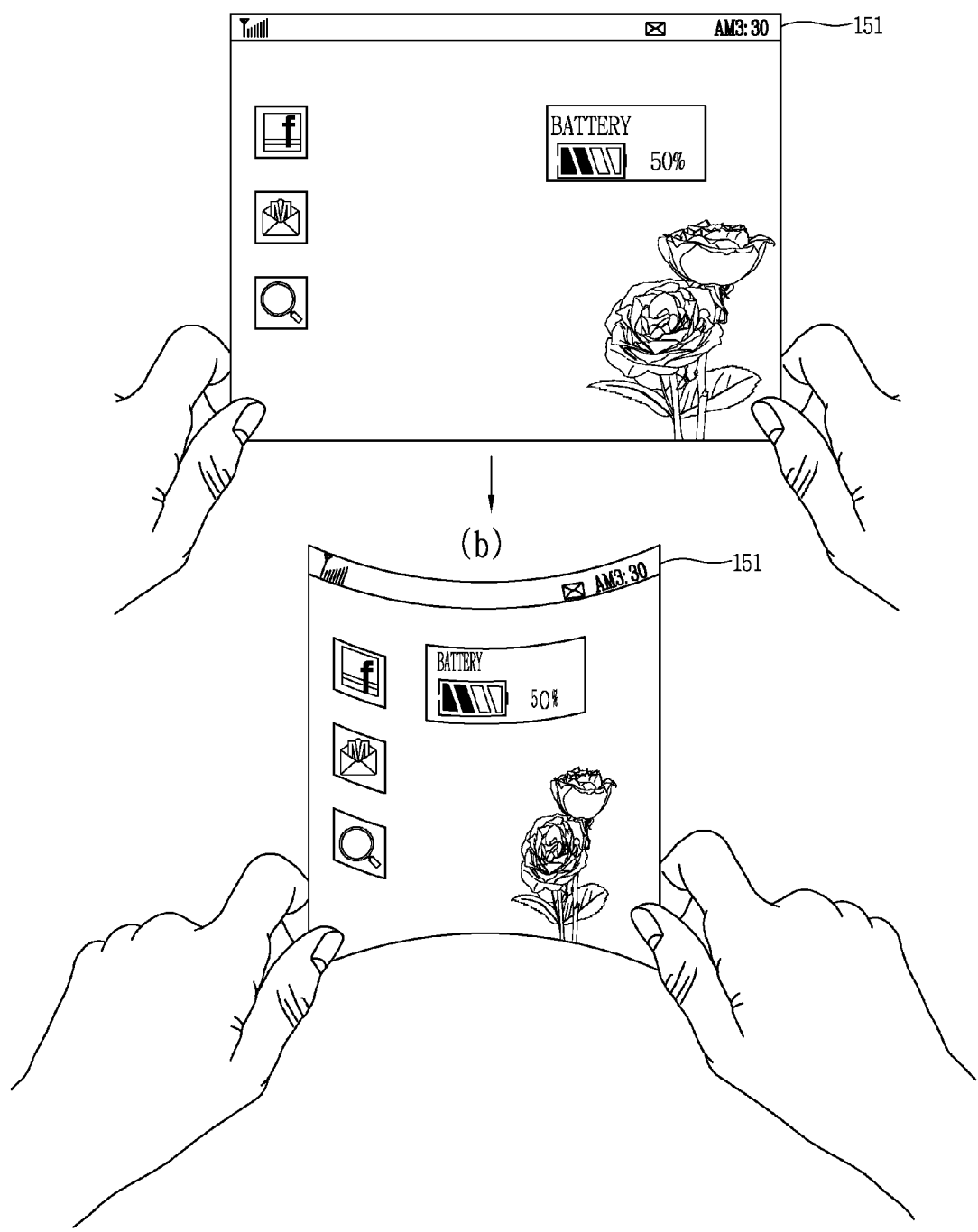
FIGS. 2A and 2B are conceptual views for explaining a flexible display unit provided in a mobile terminal according to an embodiment of the present disclosure.
Figure 2B:
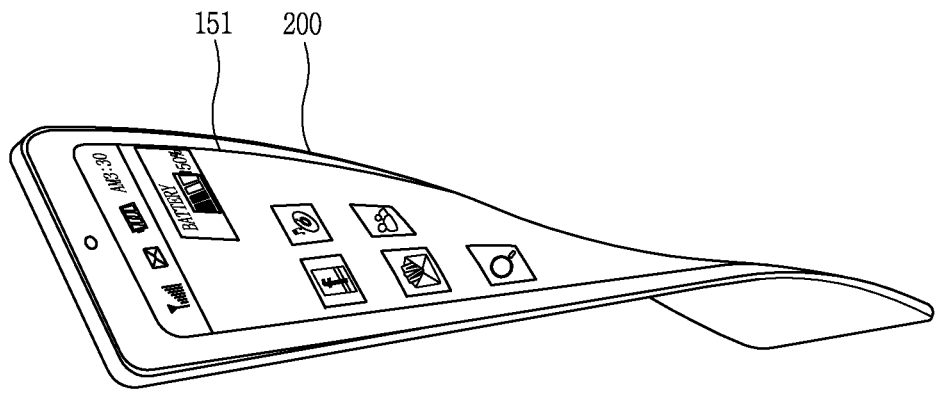

On the other hand, information processed in the mobile terminal 100 may be displayed using a flexible display. Hereinafter, a flexible display unit will be described in more detail with reference to the accompanying drawings. FIGS. 2A and 2B are conceptual views for explaining a flexible display unit provided in a mobile terminal according to an embodiment of the present disclosure.

As illustrated in FIGS. 2A and 2B, the display unit 151 may include a display that can be wound, bent, twisted, folded or rolled by an external force. Here, the flexible display unit 151 may include both a typical flexible display unit and an electronic paper.

Here, a typical flexible display unit denotes a light, non-fragile, rigid display fabricated on a thin and flexible substrate that can be wound, bent, folded or rolled like a paper sheet while maintaining the display characteristics of a flat display in the related art.

Furthermore, the electronic paper has a different aspect from the typical flat display as a display technology to which typical ink characteristics are applied. The electronic paper may modify a drawing or text using electrophoresis with twist balls or capsules.

On the other hand, a sensing unit 181 (refer to FIG. 1) as well as the flexible display unit 151 may be provided in a mobile terminal to sense the warpage information of the flexible display unit 151. The word "warpage" in the present disclosure may include all the meanings of being wound, rolled, folded, bent and twisted.

The sensing unit 181 may be disposed as a whole or partially disposed on the flexible display unit 151 to sense the warpage information of the flexible display unit 151. Here, the warpage information of the flexible display unit 151 may include a warped direction, a warped degree, a warped location, a warped time, an acceleration at which the warped flexible display unit is restored to an original configuration, and the like, and may further include various information that can be sensed due to the warpage of the flexible display unit.

The display region of the flexible display unit becomes a planar surface in a configuration that the flexible display unit 151 is not warped (for example, has an infinite radius of curvature, hereinafter, referred to as a first configuration). The display region thereof may be a curved surface in a configuration that the flexible display unit 151 is warped by an external force from the first configuration (for example, has a finite radius of curvature, hereinafter, referred to as a second configuration).

The sensing unit 181 may be formed to sense the warpage of the flexible display unit 151. For such an example, the sensing unit 181 may include an acceleration sensor (or gyro sensor). In other words, when the flexible display unit 151 is inclined from the first configuration and second configuration, the sensing unit senses it.

Furthermore, the controller 180 may change information displayed on the flexible display unit 151 or generate a control signal for controlling the function of the mobile terminal based on at least one of the warpage information and inclination information of the flexible display unit sensed by the sensing unit 181.

For example, when the flexible display unit 151 is warped by an external force as illustrated in FIGS. 2A(a) and 2A(b), the controller 180 may switch a screen image previously displayed on the flexible display unit 151 to another screen image according to a warped direction, a warped angle, and a restoring acceleration being restored to an original configuration.

For an example, when the flexible display unit 151 is warped in an inward direction by an external force as illustrated in FIGS. 2A(a) and 2A(b), the controller 180 may display screen images displayed on the flexible display unit 151 to be closer to one another. On the contrary, when the flexible display unit 151 is warped in an outward direction by an external physical force, the controller 180 may display screen images displayed on the flexible display unit 151 to be separated from one another.

On the other hand, a mobile terminal including the flexible display unit 151 according to the present disclosure may include a case 200 surrounding the flexible display unit 151 as illustrated in FIG. 2B. The case 200 may be configured to form a space for accommodating hardware such as the sensing unit 181. Furthermore, the case 200 may be configured to allow it to be warped along with the flexible display unit 151 by an external force in consideration of the characteristics of the flexible display unit 151.

On the other hand, as described above, the controller 180 can generate a control signal associated with the function of a mobile terminal according to the present disclosure in response to the warpage information of the flexible display unit 151.

For such an example, hereinafter, a method of allowing the flexible display unit 151 to display information on a plurality of virtual layers in response to the warpage of the flexible display unit 151 while displaying a single virtual layer will be described.

Figure 3:
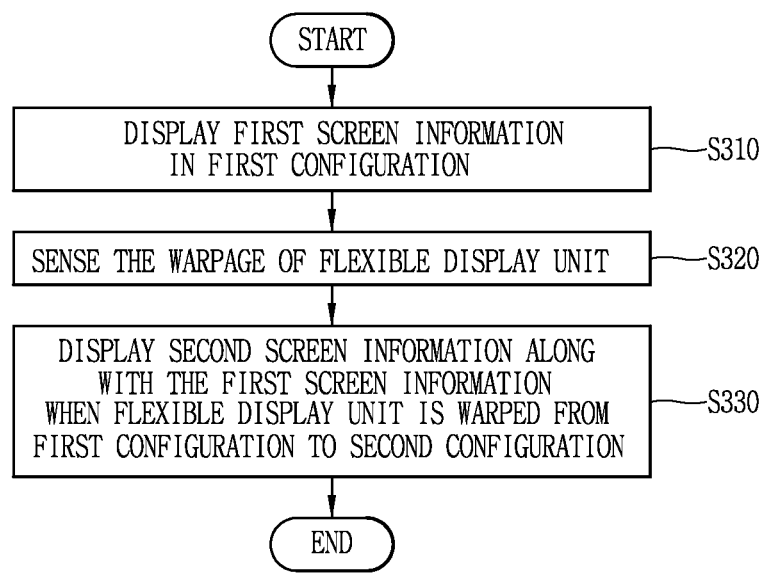
FIG. 3 is a flow chart for explaining a control method of displaying screen information according to the warpage of a flexible display unit in a mobile terminal according to an embodiment of the present disclosure.

FIG. 3 is a flow chart for explaining a control method of displaying screen information according to the warpage of a flexible display unit in a mobile terminal according to an embodiment of the present disclosure, and FIGS. 4A, 4B and 4C are conceptual views for explaining the foregoing control method of FIG. 3.

First, the process of displaying first screen information on the flexible display unit 151 in the first configuration is carried out (S310). Here, the first screen information may be any one execution screen of a plurality of applications currently being driven.

The first screen information may be displayed using a single virtual layer (or layer). Here, the virtual layer is an expression for functions or regions that are controlled in a similar manner since they have the same software level. For example, the controller 180 may map different virtual layers to a plurality of regions, respectively, to generate a control signal corresponding to a different function for each of the plurality of regions. Furthermore, if an execution screen is not displayed on the current flexible display unit 151 on a virtual layer, an application capable of immediately displaying an execution screen may be set by the user's manipulation.

In other words, a different application may be displayed on a different virtual layer, and moreover, screen information may be displayed over a plurality of virtual layers even in case of the same application.

In this manner, the layer (or virtual layer) may be a type of virtual plane containing screen information displayed on the flexible display unit 151.

As described above, the process of sensing the warpage of the flexible display unit is carried out in a state that first screen information is displayed through a single virtual layer (S320). Here, the warpage is made by an external force applied to the flexible display unit 151, and the external force may be applied by the user or an object other than the user.

When the flexible display unit 151 is warped from the first configuration to the second configuration, the controller 180 may control the sensing unit 140 to sense the warpage of the flexible display unit 151.

On the other hand, when the flexible display unit 151 is warped from the first configuration to the second configuration as in the process of S320, the process of displaying second screen information along with the first screen information on the flexible display unit 151 is carried out (S330).

Here, the second screen information may be screen information corresponding to a different application from an application corresponding to the first screen information.

The second screen information may include screen information contained in a different layer from a layer containing the first screen information. Moreover, an application corresponding to the second screen information may be an application that can be multi-tasked on a mobile terminal along with an application corresponding to the first screen information.

On the other hand, when a plurality of applications are multi-tasked in a mobile terminal, screen information corresponding to the plurality of applications, respectively, may be contained in a plurality of layers, respectively. Furthermore, information corresponding to the multi-tasked plurality of applications, respectively, namely, screen information corresponding to a plurality of layers, respectively, may be displayed on the flexible display unit 151 in response to the flexible display unit 151 being warped from the first configuration to the second configuration.

In this manner, when the flexible display unit 151 is warped, the user can receive screen information on application being currently multi-tasked.

Furthermore, when the flexible display unit 151 is warped from the first configuration to the second configuration even in case of an application not being currently multi-tasked, the screen information of an application that has been executed on the mobile terminal prior to executing an application corresponding to the first screen information, may be displayed along with the first screen information. In other words, the controller 180 may display the screen information (or execution screen) of an application that is being multi-tasked or that has been recently used in response to the flexible display unit being warped.

In this manner, screen information displayed in response to the warpage of the flexible display unit 151 may be screen information contained in different layers, respectively, and screen information contained in the different layers may be the execution screens of applications.

On the other hand, the controller 180 may control the flexible display unit 151 to display the screen information in the second configuration only when the warpage of the flexible display unit 151 corresponds to a preset criterion. Here, the preset criterion may be associated with at least one of the speed, frequency, location, direction and retention time of warpage of the flexible display unit 151 based on the user's selection or terminal's setting. Furthermore, the preset criterion may be the maintaining of the warpage of the flexible display unit 151 greater than a preset period of time.

For another example, when the flexible display unit 151 is warped, information associated with the preset criterion may be displayed on the flexible display unit 151. For a more specific example, when the warpage of the flexible display unit 151 is maintained for greater than a preset period of time, information on the actual retention time may be displayed using various images (for example, sand clock, watch or the like) or texts.

On the other hand, when the flexible display unit 151 is warped from the second configuration to the first configuration, the controller 180 may display screen information corresponding to at least part of a plurality of screen information displayed in the second configuration. For example, when the flexible display unit 151 is restored to the first configuration in a state that the first screen information of a first application and the second screen information of a second application are displayed, at least one of the first screen information and second screen information may be displayed on the flexible display unit 151. When the first and the second screen information are displayed at the same time, the flexible display unit 151 may be divided into a plurality of regions, and the first and the second screen information may be displayed in the plurality of divided regions, respectively.

Moreover, even when the warpage of the flexible display unit 151 is sensed in the first configuration, at least one of the other screen information may not be displayed along with screen information displayed in the first configuration. In other words, in this case, the same screen information as screen information displayed in the first configuration may be displayed even in the second configuration.

For example, when the user does not intend to display multiple information (or multitasking information, application use information), the function may be restricted by the user's setting. In other words, a control method according to the present disclosure may be selectively carried out by the user's setting. Furthermore, when switched from the first configuration to the second configuration, the controller 180 may display a message indicating that it has been set to change the displayed information using a pop-up window.

As described above, a mobile terminal and a control method thereof according to an embodiment of the present disclosure, when the warpage status of the flexible display unit is changed from the first configuration to the second configuration, information on an application being multi-tasked may be displayed.

Hereinafter, a method of displaying the multi-tasking information will be described in more detail with reference to the accompanying drawings.

FIGS. 4A, 4B and 4C are conceptual views for explaining the foregoing control method of FIG. 3.

According to an embodiment, on the flexible display unit 151 according to an embodiment of the present disclosure, the warpage of the flexible display unit 151 may be changed to the second configuration based on an external force as illustrated in FIG. 4A(b) while first screen information (or first execution screen 410) corresponding to a first application is displayed on the flexible display unit 151 in the first configuration as illustrated in FIG. 4A(a). In this case, the controller 180 may a first image object 421 corresponding to the first screen information 410 and at least one image object 422, 423 corresponding to a different application from the first application on the flexible display unit 151.

Here, the first application and different application may be driven on different layers, respectively.

For example, when there is one application being multi-tasked along with the first application, the number of image objects may be two in the second configuration. For example, the two image objects may be a first image object corresponding to the first application and an image object corresponding to the other application. Furthermore, when there is two applications being multi-tasked along with the first application, image objects 421, 422, 423 corresponding to the first application and the two different applications may be displayed in the second configuration as illustrated in FIG. 4A(b).

On the other hand, here, the image object may have visual appearance corresponding to the screen information (or execution screen) of the application. In other words, the screen information of the relevant application may be displayed in a reduced manner on the image object. Furthermore, the image object may correspond to the visual appearance of different layers containing the execution screens of different applications, respectively.

For another example, on the flexible display unit 151 according to an embodiment of the present disclosure, the warpage of the flexible display unit 151 may be changed to the second configuration based on an external force as illustrated in FIG. 4B(a) while first screen information (or first execution screen 410) corresponding to a first application is displayed on the flexible display unit 151 in the first configuration as illustrated in FIG. 4A(a). Furthermore, in the second configuration, the controller 180 may display the second screen information 420 of a second application being multi-tasked to be overlapped with the first screen information 410 of the first application in the second configuration. Accordingly, the user can identify the first and the second screen information 410, 420 at the same time through the flexible display unit 151.

In this manner, either one of the first or the second screen information 410, 420 can be identified even in a state that the first and the second screen information 410, 420 are overlapped with each other. In other words, either one of a layer corresponding to the first screen information 410 or a layer corresponding to the 420 may be displayed in a transparent manner to project it on screen information contained in another layer. In this case, as illustrated in FIG. 4B(b), a layer 421 containing any one screen information may be configured to cover a layer 422 containing another screen information.

On the other hand, according to the foregoing embodiment, it has been described a case where the first and the second application are multi-tasked as an example, but in a mobile terminal according to an embodiment of the present disclosure, the foregoing embodiment can be applied in a similar manner or applied in a modified manner even in case where three or more applications other than two applications are multi-tasked.

On the other hand, as previously illustrated in FIGS. 4A and 4B, when information corresponding to an application being multi-tasked is displayed in response to the flexible display unit 151 being warped into the second configuration and then the status of the flexible display unit 151 is switched again to the first configuration, the controller 180 may display screen information corresponding to any one of the multi-tasked applications on the flexible display unit 151 as illustrated in FIGS. 4C(b) and 4C(c).

Here, when the flexible display unit 151 is switched from the second configuration to the first configuration, screen information displayed on the flexible display unit 151 may be based on the user's selection or based on the degree of warpage of the flexible display unit 151 or the like. Furthermore, when the flexible display unit 151 is switched from the second configuration to the first configuration, screen information displayed on the flexible display unit 151 may be screen information that has been displayed on the flexible display unit 151 prior to the flexible display unit 151 being warped into the second configuration.

On the other hand, even when the flexible display unit 151 is warped into the second configuration, an image object or screen information corresponding to a different application may not be displayed as illustrated in FIGS. 4A(b) and 4B(b) in case where there does not exist an application being multi-tasked along with the first application.

As described above, in a mobile terminal and a control method thereof according to an embodiment of the present disclosure, information on an application currently being driven may be displayed in response to the warpage of the flexible display unit, thereby allowing the user to receive information on an application currently being driven using only a simple manipulation even without applying an additional control command to the mobile terminal.

Figure 5A:
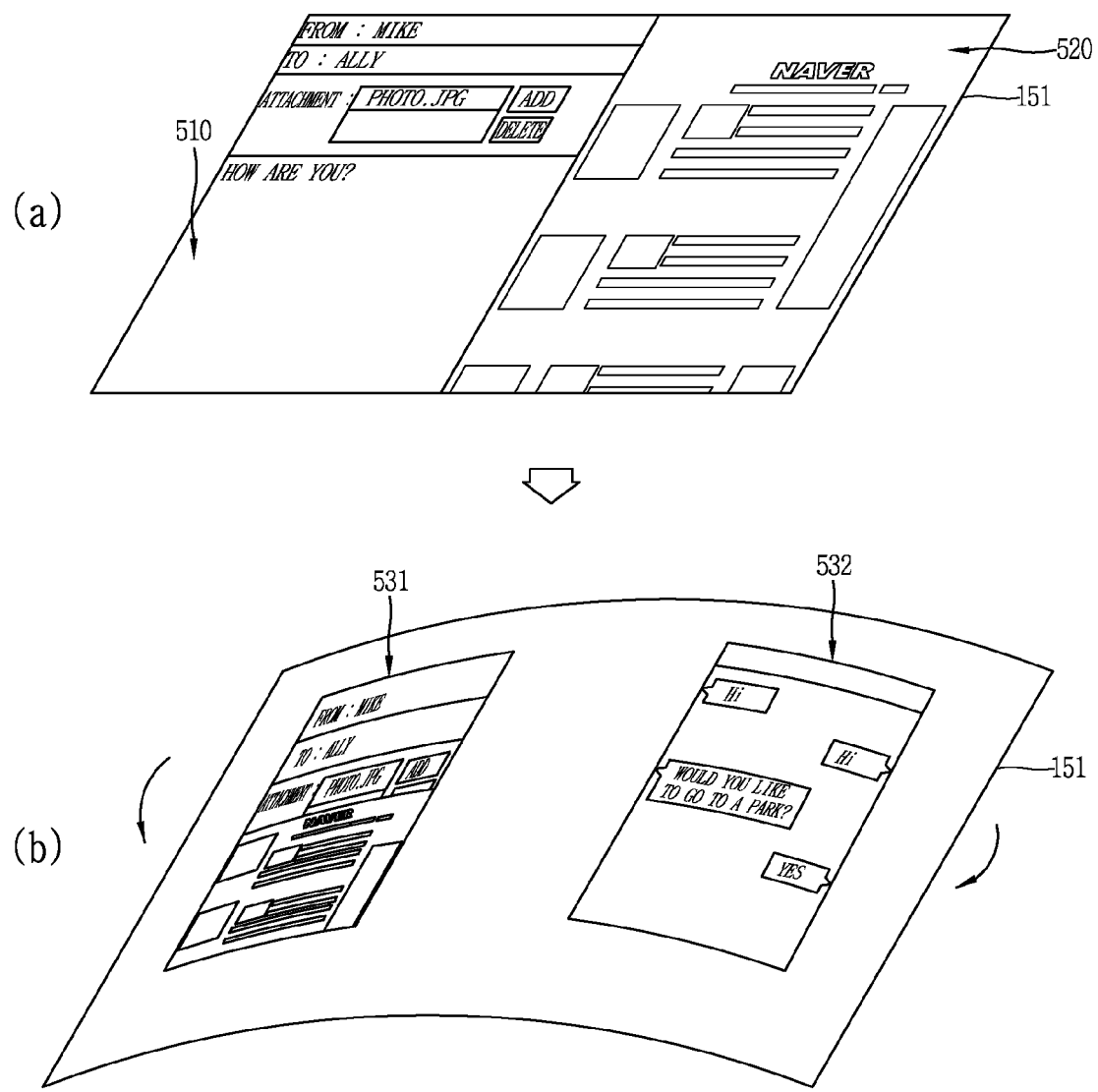
Figure 5B:
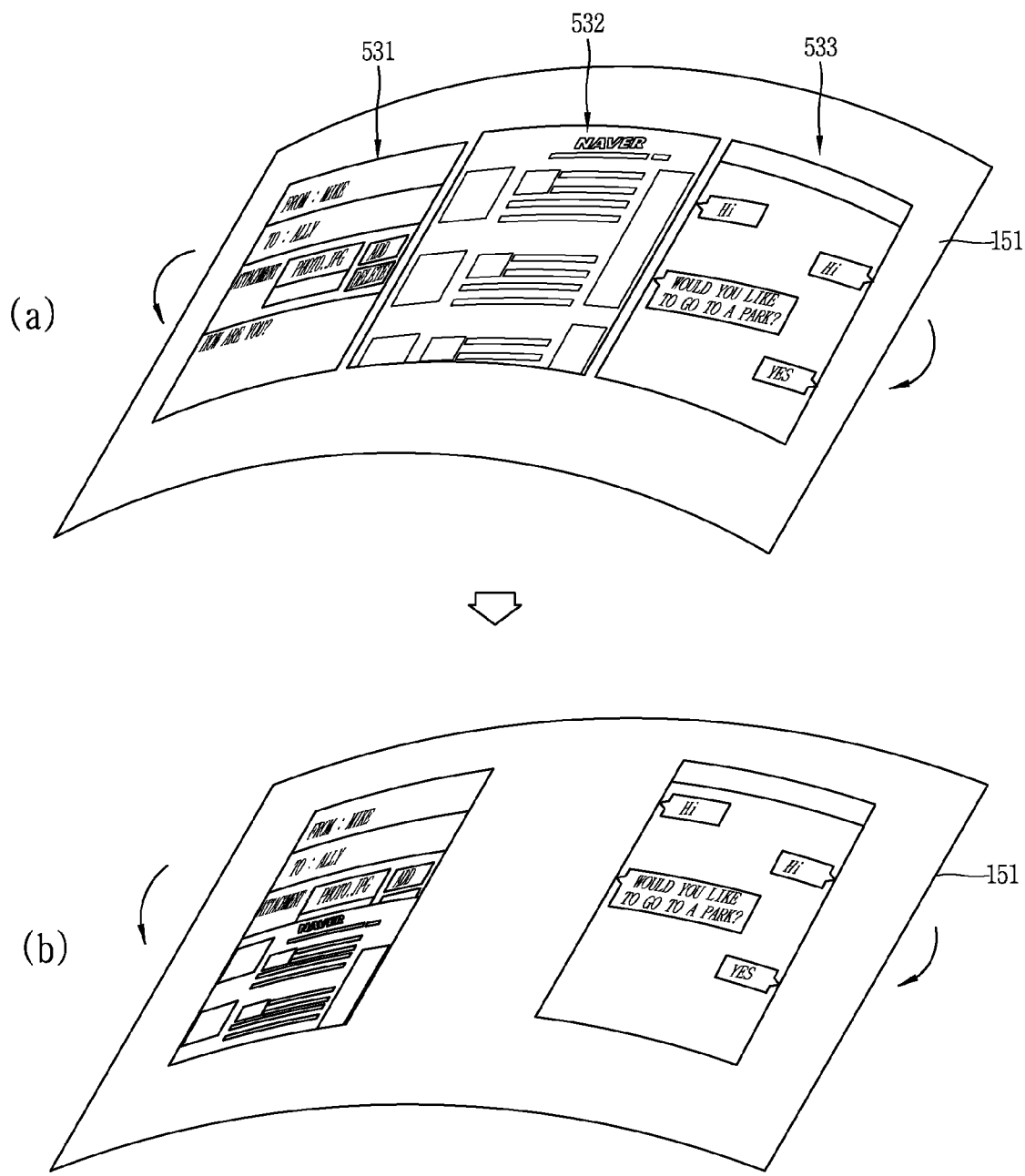

Hereinafter, a method of controlling screen information when a plurality of applications are driven on one virtual layer, and the flexible display unit is warped into the second continuation will be described in more detail with reference to the accompanying drawings. FIGS. 5A, 5B and 5C are conceptual views for explaining a method of controlling screen information when a plurality of applications are driven on one layer in a mobile terminal according to an embodiment of the present disclosure.

In a mobile terminal according to an embodiment of the present disclosure, the flexible display unit 151 may be divided into a plurality of regions, and the screen information of different applications may be displayed in the plurality of divided regions. In other words, the controller 180 may display the execution screens of different applications at the same time on the flexible display unit 151. In this case, the user can use a plurality of applications at the same time through one display region. The plurality of applications may be driven on one layer (or virtual layer).

When the flexible display unit 151 is warped into the second configuration while a plurality of applications are driven on one virtual layer as illustrated in FIG. 5A(b), the controller 180 may control such that an image object 531 corresponding to a layer on which a plurality of applications are driven displays an image object 532 corresponding to another application being multi-tasked. Here, it is manifest that when the another application being multi-tasked does not exist, only an image object 531 corresponding to a layer on which a plurality of applications are driven may be displayed.

On the other hand, in a mobile terminal according to an embodiment of the present disclosure, the plurality of applications may be driven on additional different layers in response to a touch input to the image object 531 corresponding to a layer on which the plurality of applications are driven or a change of the degree of warpage of the flexible display unit 151.

For example, as illustrated in FIGS. 5A(b) and 5B(a), the controller 180 may drive any one of the plurality of applications on the layer, and drive another one of the plurality of applications on a layer different from the layer based on the degree of warpage of the flexible display unit out of the reference range. Accordingly, an image object 533 corresponding to the different layer may be further displayed on the flexible display unit 151 as illustrated in the drawing.

On the other hand, when the flexible display unit 151 is converted into the first configuration in response to any one of the image objects being selected, an execution screen corresponding to the selected image object may be displayed on the flexible display unit.

On the other hand, when the degree of warpage of the flexible display unit is out of the reference range and then restored within the reference range again, the controller 180 may allow the plurality of applications to be driven on one layer again. In this case, the image object 533 displayed in response to the warpage of the flexible display unit 151 being out of the reference range may be no more displayed. Furthermore, in this case, the graphic object 531 that has been displayed on the flexible display unit 151 prior to the warpage of the flexible display unit 151 being out of the reference range may be displayed again on the flexible display unit 151.

On the other hand, in a mobile terminal according to an embodiment of the present disclosure, screen information to be displayed in the first configuration may be determined according to a position at which a touch is applied to the graphic object 531 corresponding to a layer on which a plurality of applications are driven.

For example, when touching a boundary region 532c other than a region 531a, 531b in which an image corresponding to the screen information of an application is displayed as illustrated in FIG. 5C(a), the controller 180 may display a layer containing screen information corresponding to the plurality of applications on the display unit 151 as illustrated in FIG. 5C(b). In other words, in this case, the controller 180 may continuously drive a plurality of applications on one layer.

As another example, when a region 531a, 531b displayed with an image corresponding to the screen information of an application is touched as illustrated in FIG. 5C(a), the controller 180 may display the screen information of an application corresponding to the touched region as a whole on the flexible display unit 151 as illustrated in FIG. 5C(c).

In this case, the controller 180 may no more drive a plurality of application on one layer but drive them on separate layers.

As described above, in a mobile terminal according to an embodiment of the present disclosure, when a plurality of applications are driven on one layer, the user can select whether to continuously drive the plurality of applications on one layer or separately drive them on different layers, respectively, using at least one of a warpage of and a touch input to the flexible display unit 151.

Figure 6B:
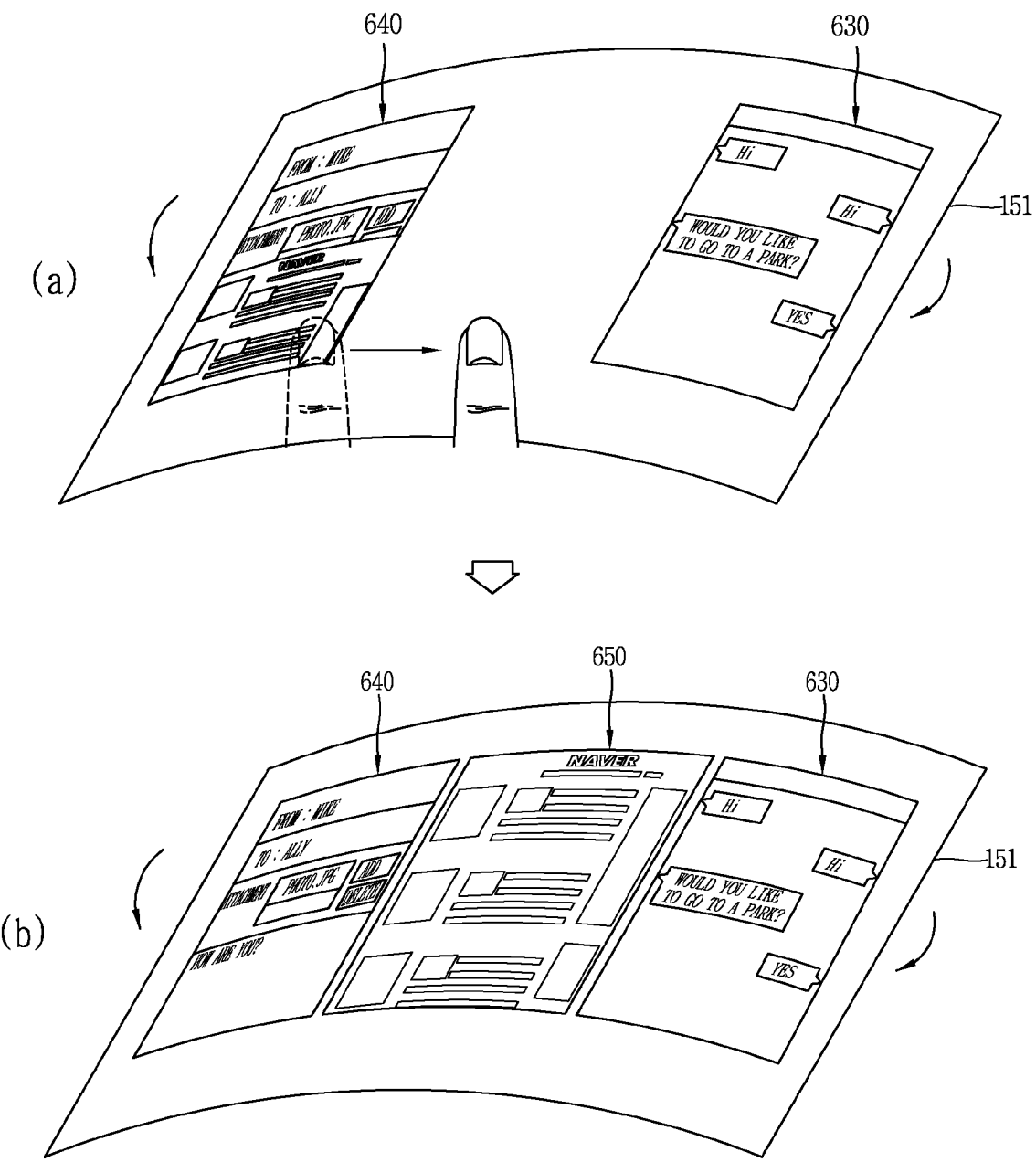

Hereinafter, a method of driving applications driven on different layers on one layer will be described in more detail with reference to the accompanying drawings. FIGS. 6A and 6B are conceptual views for explaining a method of dividing a screen in a mobile terminal according to an embodiment of the present disclosure.

As described above, in a mobile terminal according to an embodiment of the present disclosure, when the flexible display unit 151 is warped from the first configuration to the second configuration, graphic objects corresponding to at least one application, respectively, currently driven on the mobile terminal may be displayed on the flexible display unit 151. Accordingly, the user can check which applications are currently driven on the mobile terminal, and moreover, select any one of the graphic objects, thereby promptly performing a switch between applications.

On the other hand, in a mobile terminal according to an embodiment of the present disclosure, when the flexible display unit 151 is warped into the second configuration, and graphic objects 610, 620, 630 corresponding to at least one application are displayed in response to this, and then at one graphic object is moved to another one based on a preset mode based touch to any one of the graphic objects 610, 620, 630 as illustrated in FIG. 6A(a), applications corresponding to the any one and another one graphic objects may be driven on one layer.

On the other hand, when one image object contains screen information corresponding to one application as illustrated in FIG. 6A(a), the one application may be in a state that it is driven on a single layer. Furthermore, when the second image object 620 is moved to the first image object 610 or a touch input (for example, drag touch or the like) to the second image object 620 is applied toward the first image object 610 as illustrated in FIG. 6A(a), the controller 180 may newly display a fourth image object 640 to which screen information corresponding to the first and the second image object 610, 620 are merged as illustrated in FIG. 6A(b). In this case, the first and the second image object 610, 620 may no longer be displayed. Meanwhile, when a fourth image object is displayed in response to a touch to either one of the first and the second image object 610, 620, the controller 180 may drive applications corresponding to the first and the second image object 610, 620 on one layer. In other words, in this case, when the flexible display unit 151 is warped again into the first configuration, the controller 180 may display the execution screens of applications corresponding to the first and the second image object 610, 620 on one display screen. In other words, in this case, the flexible display unit 151 may be divided into a plurality of regions to display the execution screens of different applications, respectively, on the plurality of regions.

On the other hand, when a plurality of applications are driven on one layer as illustrated in FIG. 6B(a), the plurality of applications driven on one layer may be driven on additional layers, respectively, through a touch to the fourth image object 640. For example, a preset mode based touch (for example, drag touch) is sensed to one region of the fourth image object 640, the controller 180 may drive any one of the plurality of applications corresponding to the fourth image object 640 on an additional layer. The controller 180 may display an application corresponding to screen information displayed at a position to which the preset mode based touch is applied on an additional layer. Furthermore, the controller 180 may display a fifth image object 650 corresponding to an application driven on the additional layer along with the fourth image object 640 as illustrated in FIG. 6B(b) to indicate that a plurality of applications on a layer corresponding to the fourth image object are driven on an additional layer.

As described above, the user of a mobile terminal according to an embodiment of the present disclosure may drive a plurality of applications on one layer or apply a control command for driving applications being driven on one layer on additional layers using the warpage characteristic of the flexible display unit.

Figure 7A:
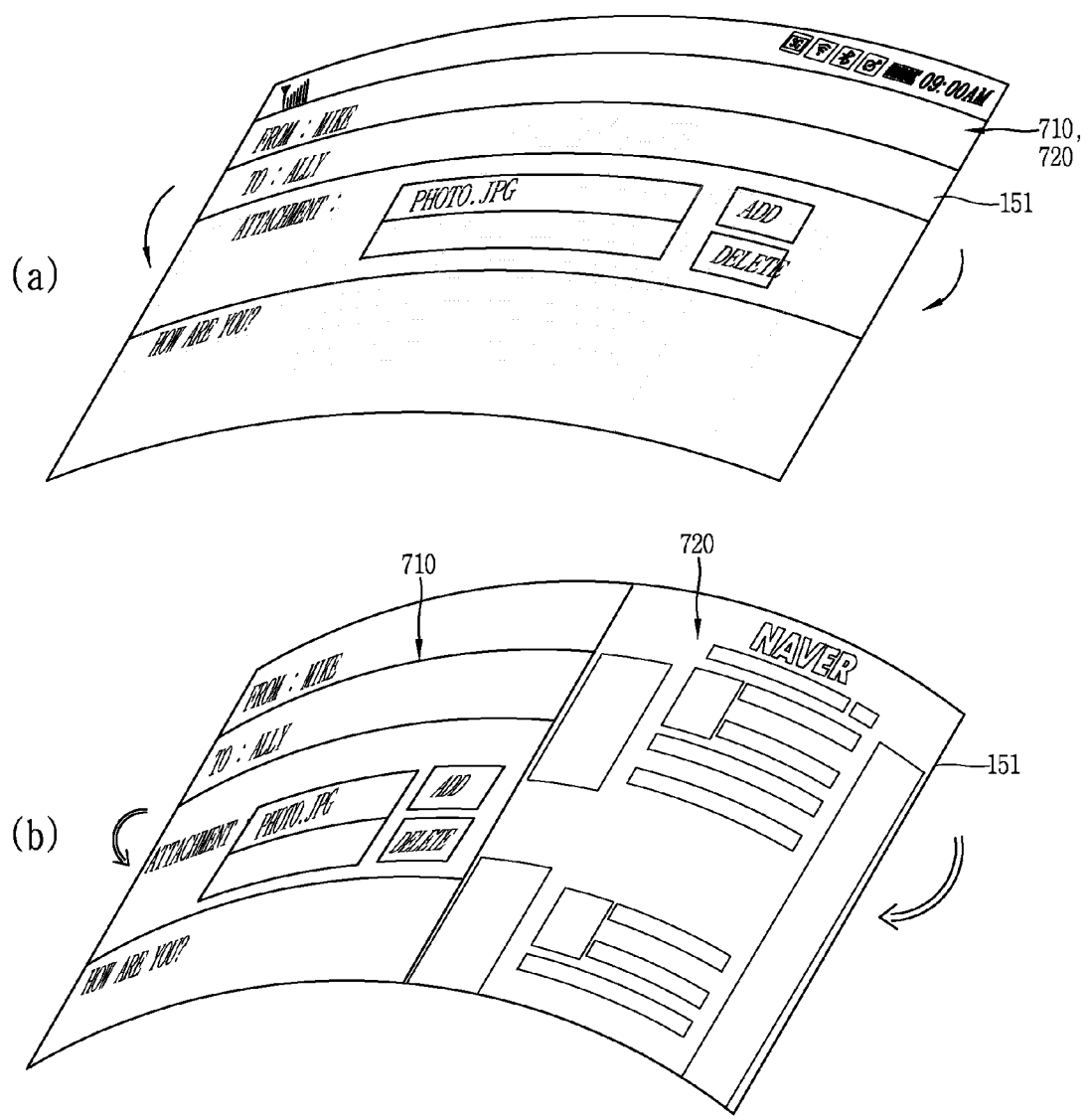

Hereinafter, a method of displaying the screen information of applications being multi-tasked using the warpage characteristic of a flexible display unit according to another embodiment of the present disclosure will be described in more detail with reference to the accompanying drawings. FIGS. 7A and 7B are conceptual views for explaining a method of displaying a plurality of screen information in a mobile terminal according to an embodiment of the present disclosure.

As previously illustrated in FIG. 4B, in a mobile terminal according to an embodiment of the present disclosure, when the warpage of the flexible display unit 151 is changed from the first configuration to the second configuration based on an external force, the controller 180 may display screen information corresponding to a plurality of applications being multi-tasked to be overlapped with one another. Accordingly, in the second configuration, the user can identify the first and the second screen information 710, 720 at the same time through the flexible display unit 151 as illustrated in FIG. 7A(a).

On the other hand, as illustrated in FIG. 7A(a), a first and a second application corresponding to the first and the second screen information may be applications driven on different layers. Moreover, when the warpage of the flexible display unit 151 is out of the reference range in a state that the flexible display unit 151 is warped into the second configuration, the controller 180 may divide the display region of the flexible display unit 151 to display the first and the second screen information in the plurality of divided regions 710, 720, respectively, as illustrated in FIG. 7A(b). In this case, when the flexible display unit 151 is warped again into the first configuration, the controller 180 may control the first and the second screen information to be continuously displayed on one screen. In other words, when the warpage of the flexible display unit is out of the reference range, the controller 180 may control the flexible display unit 151 such that a first and a second application corresponding to the first and the second screen information are driven on one layer.

For another example, when the first and the second screen information 710, 720 are overlapped with each other as illustrated in FIG. 7A(a), either one of layers corresponding to the first and the second screen information, respectively, may be configured to cover another layer thereof. In this case, when the warpage state of the flexible display unit 151 is restored to the first configuration, the controller 180 may display a layer located at an upper end on the flexible display unit 151.

For example, when a layer containing screen information corresponding to an application "electronic mail" is located at an upper end as illustrated in FIG. 7B(a), the controller 180 may display screen information corresponding to the application "electronic mail" as a whole on the flexible display unit 151 in response to the warpage of the flexible display unit 151 being restored to the first configuration. Furthermore, when a layer containing screen information corresponding to an application "webpage" is located at an upper end as illustrated in FIG. 7B(b), the controller 180 may display screen information corresponding to the application "webpage" as a whole on the flexible display unit 151 in response to the warpage of the flexible display unit 151 being restored to the first configuration. In other words, the controller 180 may determine screen information displayed in the first configuration according to which one of the layers is located at an upper end.

Furthermore, in a mobile terminal according to an embodiment of the present disclosure, as a control command for changing the layer located at an upper end, the warpage characteristic of the flexible display unit 151 can be used.

For example, when the warpage of the flexible display unit 151 is out of the reference range as illustrated in FIG. 7B(b), in a state that a layer containing screen information corresponding to the application "electronic mail" is located at an upper end as illustrated in FIG. 7B(a), the controller 180 may change the layer located at an upper end.

On the other hand, the controller 180 may allow the user to identify which one of the layers is located at an upper end using a method of displaying the layer located at an upper layer darker than the layer located at a lower end or displaying the name or icon of an application corresponding to the layer located at an upper end.

As described above, the user of a mobile terminal according to an embodiment of the present disclosure may drive a plurality of applications on one layer or determine the screen information of an application to be displayed in the first configuration using the warpage characteristic of a flexible display unit.

On the other hand, according to the foregoing embodiment, it has been described a case where the first and the second application are multi-tasked as an example, but in a mobile terminal according to an embodiment of the present disclosure, the foregoing embodiment can be applied in a similar manner or applied in a modified manner even in case where three or more applications other than two applications are multi-tasked.

On the other hand, as described above, the controller 180 can generate a control signal associated with the function of a mobile terminal according to the present disclosure in response to the warpage information of a flexible display unit.

For such an example, hereinafter, a control method of allowing the flexible display unit to display information on a plurality of virtual layers in response to the warpage of the flexible display unit while displaying a single virtual layer will be described.

Figure 8:
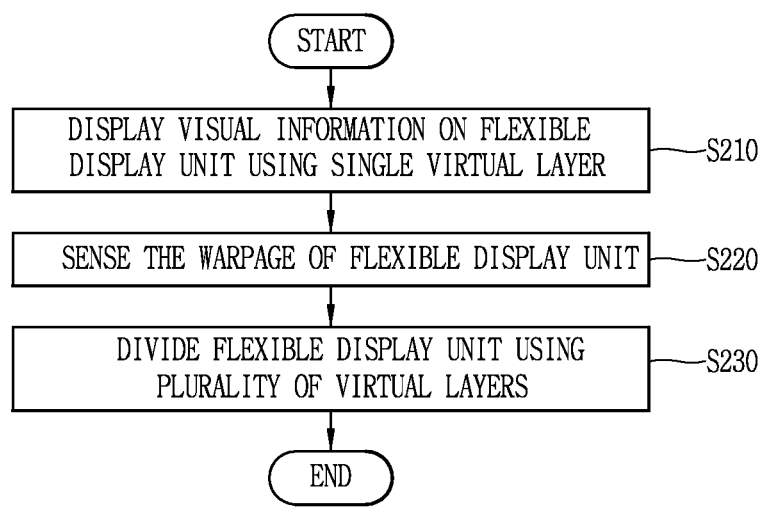
FIG. 8 is a flow chart for explaining a control method of displaying event information in response to the warpage of a flexible display unit in a mobile terminal according to an embodiment of the present disclosure.

FIG. 8 is a flow chart for explaining a control method of displaying event information in response to the warpage of a flexible display unit in a mobile terminal according to an embodiment of the present disclosure, and FIG. 9 is a conceptual view for explaining the foregoing control method of FIG. 8.

First, visual information is displayed on the flexible display unit using a single virtual layer (or layer) in the first configuration (S210). The visual information displayed on the virtual layer may be the execution screen of an application.

Here, the virtual layer is an expression for functions or regions that are controlled in a similar manner since they have the same software level. For example, the controller 180 may map different virtual layers to a plurality of regions, respectively, to generate a control signal corresponding to a different function for each of the plurality of regions. Furthermore, an execution screen is not displayed on the current flexible display unit 151 on a virtual layer, but an application capable of immediately displaying an execution screen may be set by the user's manipulation.

For a more specific example, multiple layers may be specified to multiple screens, multiple applications, and multiple functions in one application, respectively. As an example of multiple functions in one application, when different webpages are displayed in a web browser, the webpages may be displayed on different virtual layers.

Referring to FIG. 9A, the execution screen of an application is displayed on the flexible display unit, and displayed on a first virtual layer 261. Different applications previously driven by the user may be specified on a second virtual layer 262 and a third virtual layer 263.

For example, the different applications may be applications multi-tasked along with an application for which its execution screen is currently displayed on the flexible display unit. However, the present disclosure may not be necessarily limited to this, and the different applications may be an application for which the user drives it prior to driving an application for which its execution screen is currently displayed on the flexible display unit and then terminates it. Furthermore, when there is no additional execution command input, the different applications may be set not to display their execution screens on the flexible display unit.

Next, the sensing unit 181 (refer to FIG. 1) senses the warpage of the flexible display unit 151 (refer to FIG. 2A) (S220).

Here, the warpage is made by an external force applied to the flexible display unit 151, and the external force may be applied by the user or an object other than the user.

When the flexible display unit 151 is warped from the first configuration to the second configuration, the controller 180 may control the sensing unit 181 to sense the warpage of the flexible display unit 151.

On the other hand, when the warpage of the flexible display unit 151 is sensed during the step S220, the controller 180 divides the flexible display unit using a plurality of virtual layers 261, 262, 263 in the second configuration (S230).

The controller 180 may control the flexible display unit 151 to use the plurality of virtual layers 261, 262, 263 only when the warpage of the flexible display unit 151 corresponds to a preset criterion. Here, the preset criterion may be associated with at least one of the speed, frequency, location, direction and retention time of warpage of the flexible display unit 151 based on the user's selection or terminal's setting. Furthermore, the preset criterion may be maintaining the warpage of the flexible display unit 151 greater than a preset period of time.

For another example, when the flexible display unit 151 is warped, information associated with the preset criterion may be displayed on the flexible display unit 151. For a more specific example, when the warpage of the flexible display unit 151 is maintained for greater than a preset period of time, information on the actual retention time may be displayed using various images (for example, a sandglass, a watch or the like) or texts.

Referring to FIG. 9B, the execution screens of applications corresponding to the first through the third execution screen 261, 262, 263 are displayed on the flexible display unit 151 in the second configuration. A plurality of execution screens displayed in the second configuration may be formed such that the boundary lines thereof are separated from one another.

In this manner, when the execution screen of an application is displayed on the flexible display unit 151 in the first configuration, and the flexible display unit 151 is warped from the first configuration to the second configuration, the controller performs a function of displaying another execution screen along with the execution screen on the flexible display unit 151.

In other words, the controller 180 determines whether to set the flexible display unit 151 to a single layer 261 or divide it into a plurality of virtual layers 261, 262, 263 according to whether or not the warpage of the flexible display unit 151 is sensed. For a more specific example, a single execution screen is displayed in the first configuration, and a plurality of execution screens are displayed in the second configuration using the virtual layers 261, 262, 263. However, the present disclosure may not be necessarily limited to this, and visual information may not be displayed on part of the virtual layers 261, 262, 263 in the second configuration.

Furthermore, part of the virtual layers 261, 262, 263 may be set to a state prior to the execution of a specific function or application in the second configuration. For a state prior to the execution, a list of applications associated with an application executed in the first configuration or a list of default applications set by the user may be displayed. For another example, a list of frequently used applications may be displayed. In this case, when the user selects the relevant function or application, the selected function or application may be carried out.

An execution screen displayed in the first configuration may be formed in parallel to the flexible display unit 151, and a plurality of execution screens displayed in the second configuration may be formed to be inclined to the flexible display unit 151. In other words, the virtual layers 261, 262, 263 may have a display region with an inclined shape.

In this manner, as the number of information displayed on the flexible display unit 151 is changed according to the status of the flexible display unit 151, the user can easily select information displayed on the flexible display unit 151 using the warpage characteristic.

Moreover, even when the warpage of the flexible display unit 151 is sensed in the first configuration, the controller 180 may not display the multiple information. For example, when the user does not intend to display the multiple information, the function may be restricted by the user's setting. In other words, the control method according to the present disclosure may be selectively carried out by the user's setting. Furthermore, when converted from the first configuration to the second configuration, the controller 180 may display a message indicating that the displayed information is set to be changed on the flexible display unit 151 using a popup window.

On the other hand, according to the foregoing embodiment, it has been described that a plurality of execution screens displayed in the second configuration correspond to a plurality of layers, respectively, but the present disclosure may not be necessarily limited to this. In other words, a plurality of execution screens displayed in the second configuration may be images displayed on the same layer.

Hereinafter, the foregoing control methods according to various enhanced multicast and broadcast service will be described in more detail with reference to the accompanying drawings.

Figure 10:
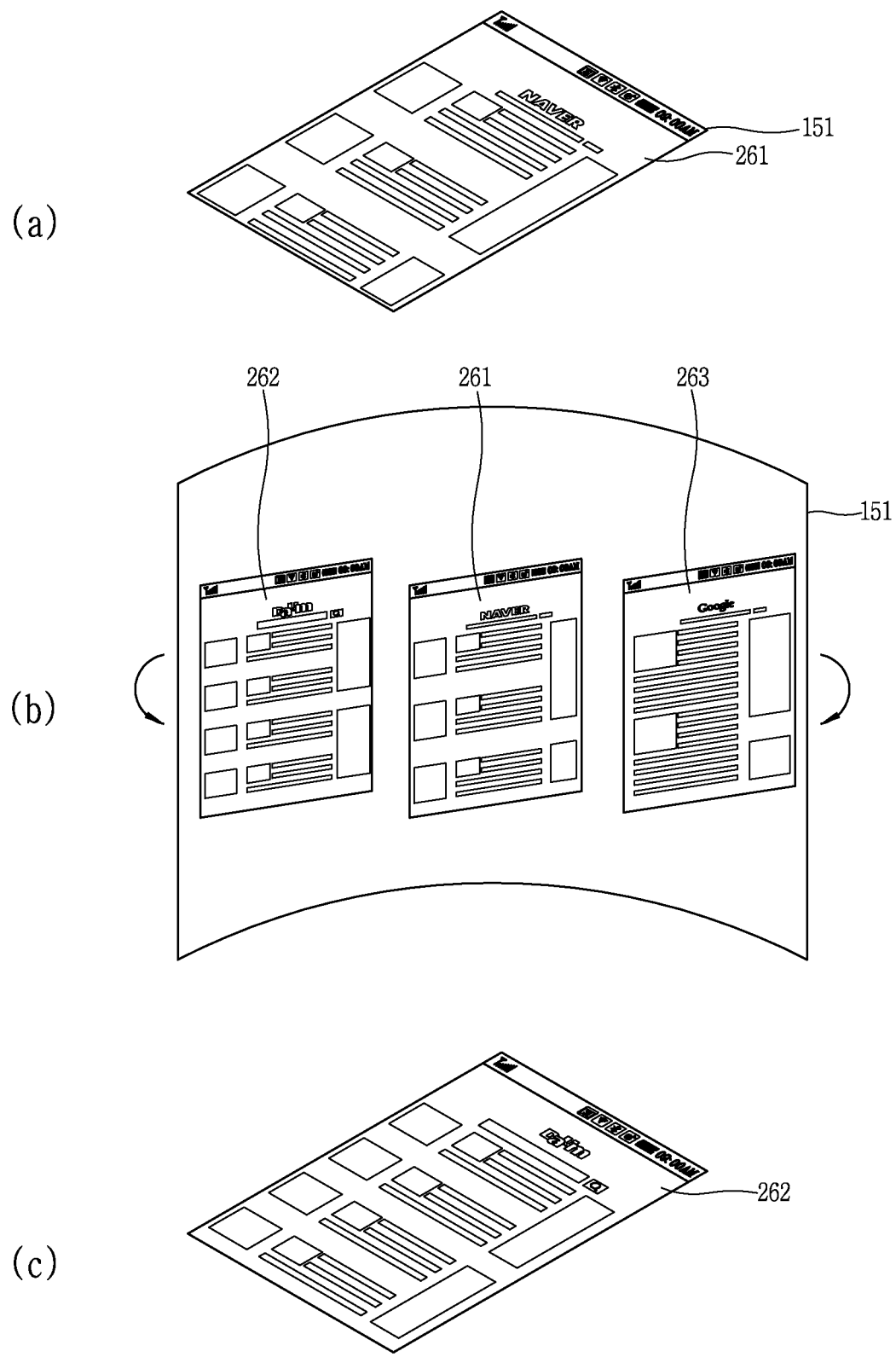
FIG. 10 is a conceptual view for explaining a control method using the warpage characteristic of a flexible display unit in a mobile terminal according to another embodiment of the present disclosure.

FIG. 10 is a conceptual view for explaining a control method using the warpage characteristic of a flexible display unit in a mobile terminal according to another embodiment of the present disclosure.

Referring to FIG. 10A, a first webpage displayed by driving a web browser in the first configuration is displayed on the flexible display unit 151. When the user applies an external force to the mobile terminal in the first configuration, the mobile terminal is converted into the second configuration while the flexible display unit 151 is warped.

Referring to FIG. 10B, the execution screens of a web browser corresponding to the first through the third virtual layers 261, 262, 263, respectively, are displayed on the flexible display unit 151 in the second configuration. More specifically, a first through a third webpage are sequentially displayed on the flexible display unit 151. The second and the third webpage may be webpages that have been displayed on the flexible display unit 151 by the user's input prior to driving a current web browser. In this case, as illustrated in the drawing, the first webpage may be displayed in the center of the flexible display unit 151 and the second and the third webpage may be displayed in the left and right sides thereof. The display sequence may be set by the user's selection.

In the second configuration, the first through the third webpage may be all displayed in an inclined shape. Accordingly, the first webpage can be displayed in a shape parallel to the flexible display unit 151 in the first configuration, but converted into an inclined shape in the second configuration. Due to the inclination, a three-dimensional effect may be given to the first through the third webpage, and a separation region may be formed between webpages, respectively. Here, a home screen page may be displayed on the separation region. Furthermore, a background screen set by the user may be displayed in the separation region.

In addition, the controller 180 may control the degree of inclination of the webpages to be varied according to the warpage speed of the flexible display unit 151.

Referring to FIG. 10C, when an external force applied to the mobile terminal is removed in the second configuration, the flexible display unit 151 is restored to the first configuration again. Here, any one of the first through the third webpage that have been displayed on the flexible display unit 151 in the second configuration may be individually displayed in the first configuration. The individually displayed object may be specified by the user. For example, when any one of the first through the third webpage (for example, second webpage) is touched in the second configuration and then converted into the first configuration, the touched webpage (for example, second webpage) may be individually displayed in the first configuration. For another example, when any one of the first through the third webpage (for example, second webpage) is touched in the second configuration, the webpage touched in the second configuration may be individually displayed.

Furthermore, in addition to a method of selecting a webpage to be individually displayed in the first configuration through a touch input, the 180 may use the warpage of the flexible display unit. For example, the user may apply more than a preset number of physical warping forces to the flexible display unit 151, thereby selecting any one of the webpages.

On the other hand, the controller 180 may display the selected webpage among the webpages to be distinguished from the other first through the third webpage in the second configuration. Here, the distinguishing method may be implemented in various ways such as enlarging or reducing the selected webpage, color change, blinking display, transparency change and the like, and it may be expressed as "highlighting" the selected execution screen.

In this manner, the controller 180 may use the plurality of layers 261, 262, 263 only in a state that the flexible display unit 151 is warped, thereby temporarily providing multiple information to the user. Through this, the user can quickly receive other information only in a state that the flexible display unit is warped and then use a function that has been originally used again, without suspending a function that has been used on the mobile terminal in the first configuration.

On the other hand, the controller 180 can control the flexible display unit 151 to continuously display the multiple information on the flexible display unit 151 even when the warpage of the flexible display unit 151 is restored to an original configuration (first configuration) based on the user's selection or terminal's selection. Furthermore, in this case, the controller 180 may terminate the output of the multiple information when a preset period of time has passed even if the warpage of the flexible display unit 151 is not restored.

Furthermore, the mobile terminal according to the present embodiment may perform a new control command by the inclination of the flexible display unit 151. Hereinafter, a control command due to the inclination will be described in more detail with reference to the accompanying drawings.

Figure 11:
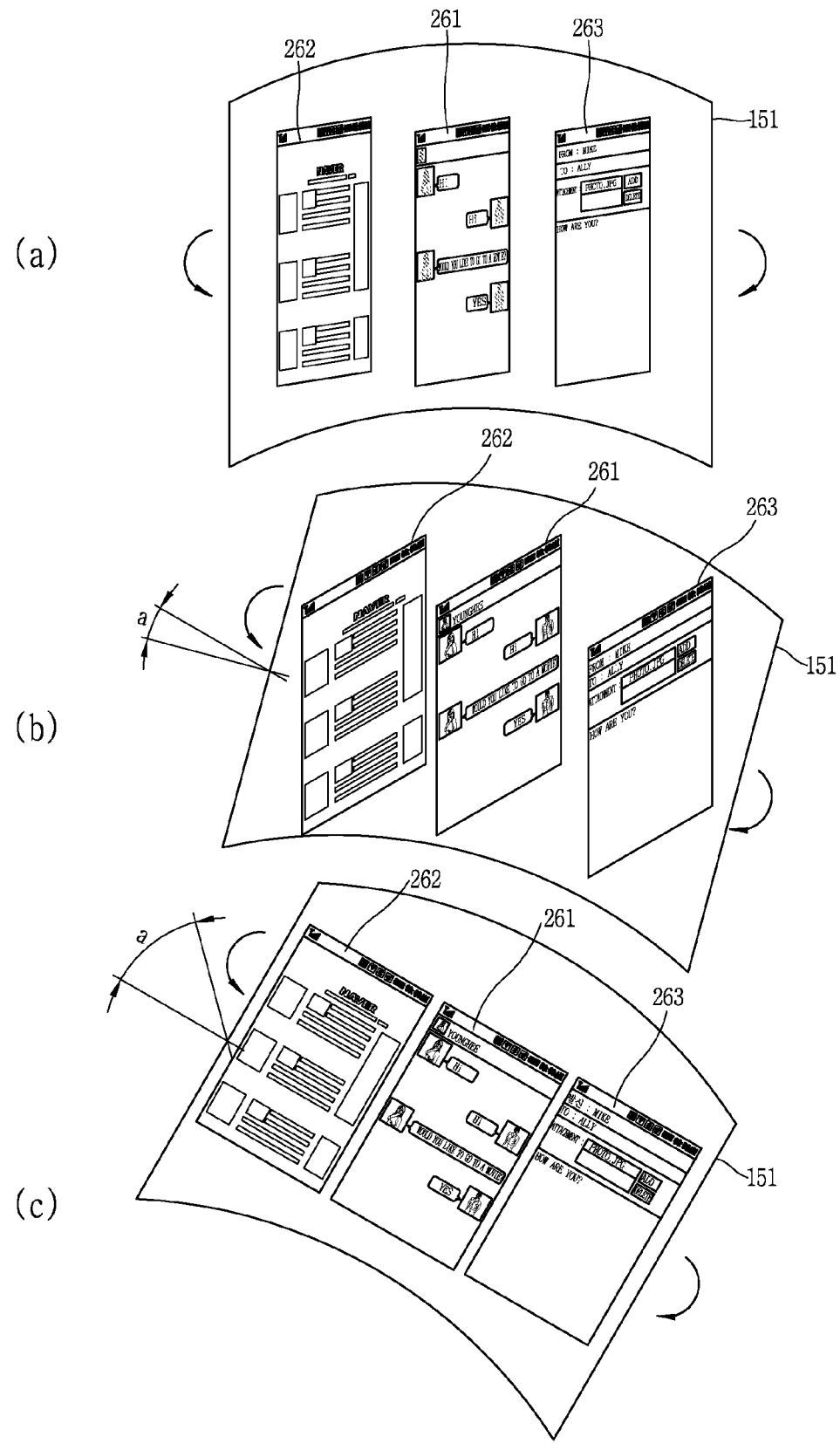
FIGS. 11 and 12 are conceptual views for explaining a control method using the warpage and inclination characteristics of a flexible display unit in a mobile terminal according to another embodiment of the present disclosure.

FIG. 11 is a conceptual view for explaining a control method using the warpage and inclination characteristics of a flexible display unit in a mobile terminal according to another embodiment of the present disclosure.

Referring to FIG. 11A, a first through a third webpage are all displayed in an inclined shape in the second configuration. Here, the mobile terminal is in a substantially horizontal configuration to the ground, and it can be sensed by the sensing unit 181 (refer to FIG. 1).

In this case, when the flexible display unit 151 is inclined in the second configuration, the size of execution screens displayed in the second configuration may be changed (refer to FIG. 11B). For example, the size change of the execution screens may be varied according to the degree of inclination of the flexible display unit 151. The change of the size is carried out in connection with a change of the degree of inclination of the displayed execution screen. In other words, when the user warps the mobile terminal and then inclines it in a lateral direction, the size of execution screens is changed while varying the degree of inclination of the first through the third webpage.

For a specific example, compared to when inclined at about 15 degrees (a=15 degrees) as illustrated in FIG. 11B, the size of webpages will be increased when inclined at about 30 degrees (a=30 degrees) as illustrated in FIG. 11C. As increasing the size of webpages and decreasing the degree of inclination, the boundary of each webpage may be brought into contact with the boundary of the adjoining webpage.

Furthermore, when the flexible display unit 151 is restored to the first configuration from the state of being warped and inclined as illustrated in FIG. 11C, only any one of the webpages may be displayed again on the flexible display unit.

However, the present disclosure may not be necessarily limited to this, and only any one of webpages can be displayed again on the flexible display unit 151 even in a state that the flexible display unit 151 is inclined but not warped due to the removal of an external force. For another example, when only warpage is removed in a state the flexible display unit 151 is warped and inclined, it may be possible to maintain a state where a plurality of webpages have been displayed in the second configuration.

Figure 12:
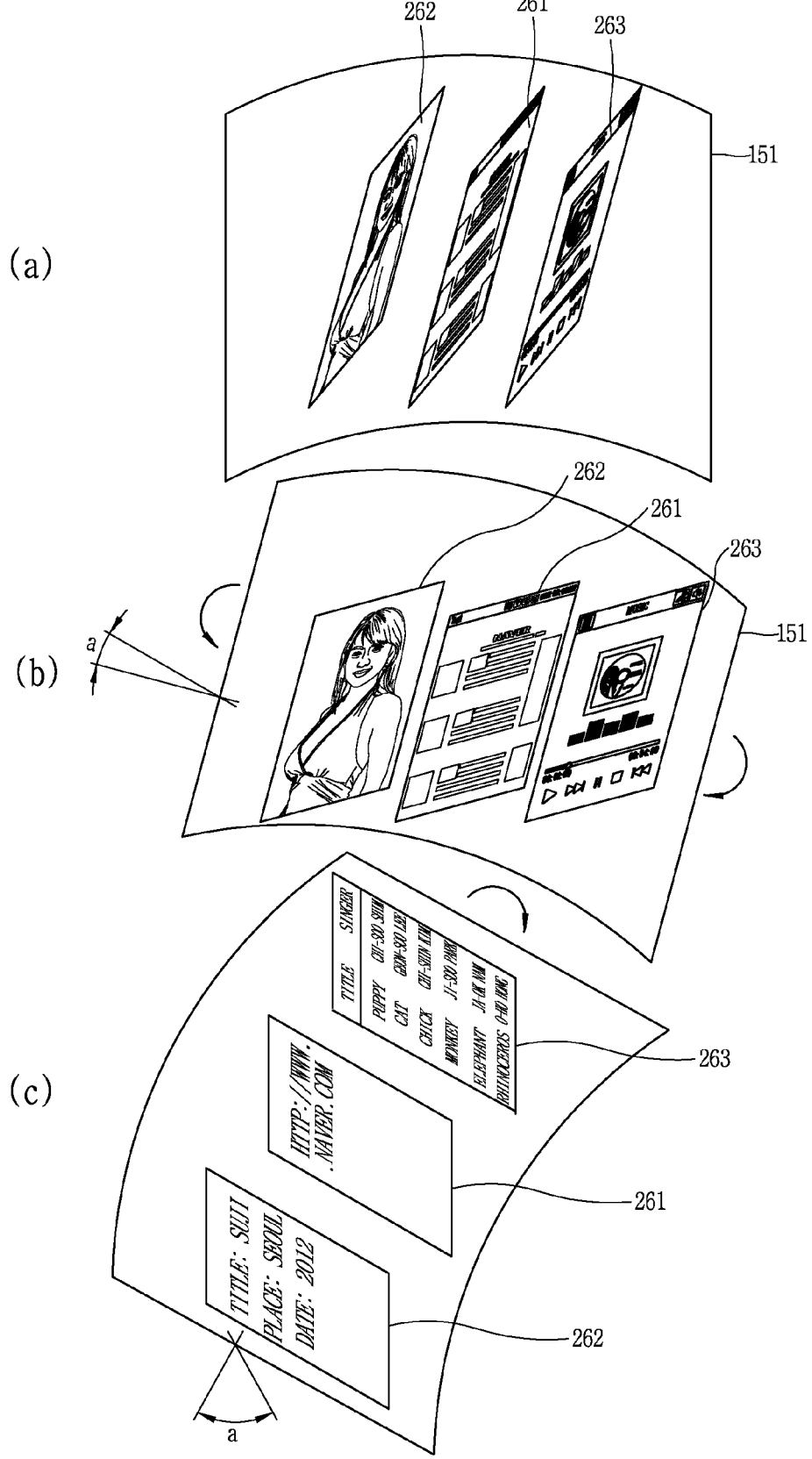

FIG. 12 is a conceptual view for explaining a control method using the warpage and inclination characteristics of a flexible display unit in a mobile terminal according to another embodiment of the present disclosure.

According to the drawing, the sensing unit 181 (refer to FIG. 1) is configured to sense the inclination of the flexible display unit 151, and when the flexible display unit 151 is inclined in the second configuration, execution screens displayed in the second configuration are changed to different shapes according to the direction of inclination.

An execution screen displayed in the second configuration may include an execution screen displayed in the first configuration. Furthermore, an execution screen displayed in the second configuration may be an execution screen of an application currently being multi-tasked on the mobile terminal or an execution screen that has been displayed on the flexible display unit 151 prior to displaying an execution screen displayed in the first configuration. Furthermore, an execution screen displayed in the second configuration may be an execution screen of an application associated with an application corresponding to an execution screen displayed in the first configuration.

On the other hand, the number of execution screens displayed in the second configuration may be changed in various ways according to circumstances.

Referring to FIG. 12A, execution screens are all displayed in an inclined shape in the second configuration. According to the present embodiment, execution screens may be webpages, gallery photo images, and music control screens. Accordingly, the first application may be a web browser, the second application a photo image display related application (for example, gallery application), and the third application a music play related application. Here, the mobile terminal is in a substantially horizontal configuration to the ground, and it can be sensed by the sensing unit 181 (refer to FIG. 1).

In this case, when the flexible display unit 151 is inclined in a first direction in the second configuration, the size of execution screens displayed in the second configuration may be changed (refer to FIG. 12B). The foregoing embodiment illustrated with reference to FIG. 11 may be applicable to the size change of the execution screens, and the description thereof will be omitted.

On the contrary, referring to FIG. 12C, when the flexible display unit 151 is inclined in a second direction in the second configuration, information associated with the execution screen is displayed on virtual layers 261, 262, 263 in which the execution screens have been displayed in the second configuration. Here, the second direction is a rotational direction opposite to the first direction.

For a more specific example, an icon indicating a bookmarked webpage may be displayed on the webpage. In this case, only the icon indicating a bookmarked webpage may be additionally displayed to be overlapped with a webpage while maintaining the display of the webpage.

For another example, information associated with a photo may be displayed on the photo image. In this case, specific information associated with a photo may be displayed while turning over the photo image. However, the present disclosure may not be necessarily limited to this, and specific information may be additionally displayed to be overlapped with a photo while maintaining the display of the photo image similarly to the webpage. The specific information may be information such as title, place, date and the like, or may be information entered by the user.

For another example, when the flexible display unit 151 is inclined in the second direction while displaying a key (for example, play (PLAY) key, fast forward (FF) key, fast rewind (FR) key, etc.), specific information on a music file currently being played, which is music subject to control, may be displayed.

For example, a progress bar indicating an audio (music) play time, a representative image of audio data (for example, a thumbnail image for a music file), audio data information (for example, music title, singer name, etc.) and the like may be displayed while a key for controlling its reproduction is disappearing.

According to the present embodiment, it is illustrated that the webpage, photo image, and music control screens are displayed on a plurality of virtual layers 261, 262, 263 on the flexible display unit, but the present disclosure may not be necessarily limited to this. In other words, the foregoing control method for the webpage, photo image, and music control screens can be separated from one another for individual examples, respectively.

In the above, a control method using the warpage and inclination of the flexible display unit has been described, but the control method may be associated with a touch input. Hereinafter, a control method using a touch input along with the warpage will be described.

Figure 13:
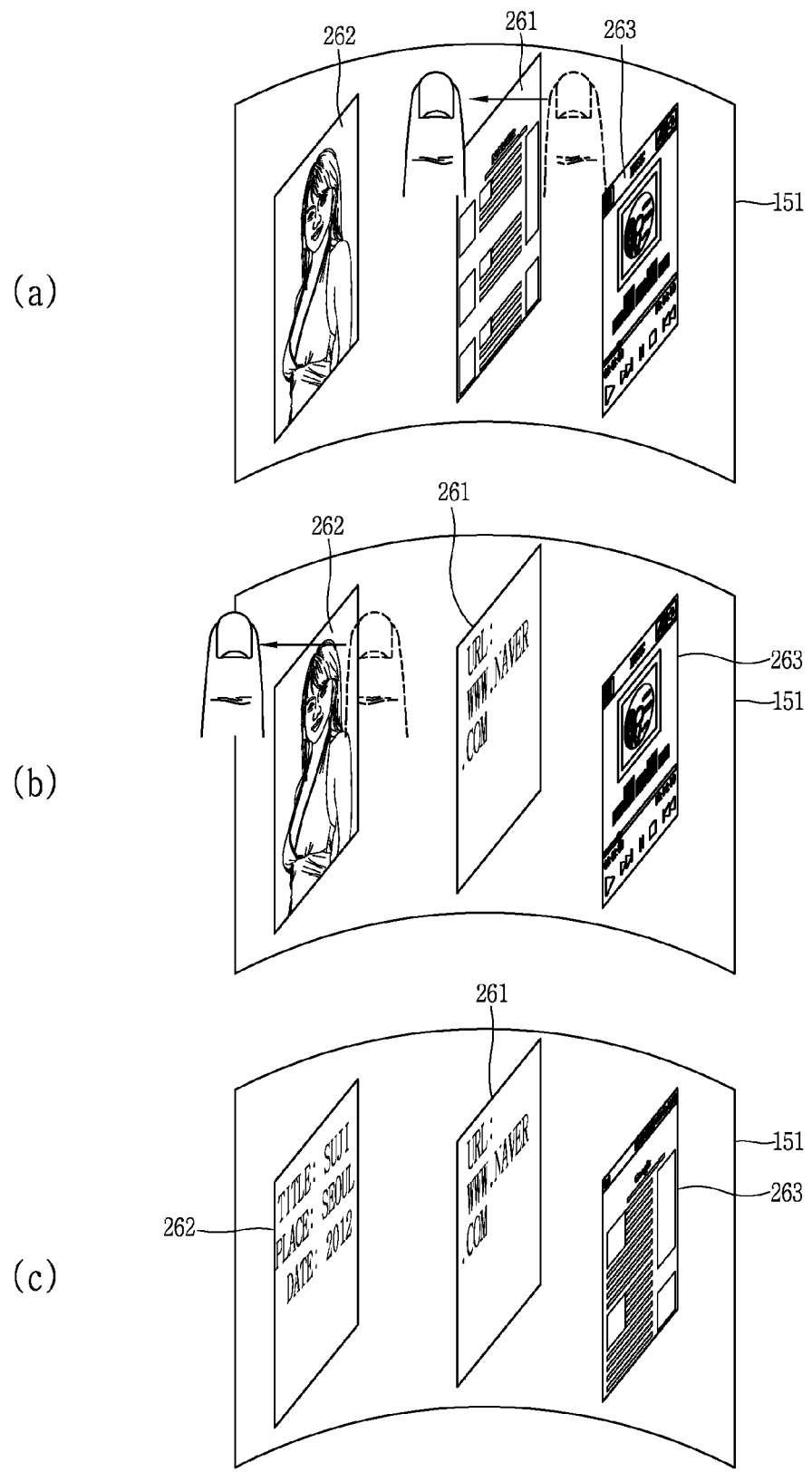
FIG. 13 is a conceptual view for explaining a control method using the warpage and touch input of a flexible display unit in a mobile terminal according to another embodiment of the present disclosure.

FIG. 13 is a conceptual view for explaining a control method using the warpage and touch input of a flexible display unit in a mobile terminal according to another embodiment of the present disclosure.

According to the drawing, when a touch input moving in one direction is applied to a plurality of execution screens displayed in the second configuration, information associated with an execution screen applied with the touch input is displayed on a virtual layer in which the execution screen applied with the input is displayed.

Furthermore, when a touch input moving in one direction is applied to a plurality of execution screens displayed in the second configuration, information associated with the relevant execution screen may be displayed for an execution screen to which the input is not applied as well as an execution screen to which the input is applied.

For example, referring to FIG. 13A, execution screens are all displayed in an inclined shape in the second configuration. According to the present embodiment, execution screens may be webpages, photo images, and music control screens. In this configuration, as illustrated in FIG. 13B, when a touch input, for example, drag or flicking moving in one direction is applied to the webpage, an icon 252 indicating a bookmarked webpage may be displayed on the webpage. In this case, only the icon 252 may be additionally displayed to be overlapped with a webpage while maintaining the display of the webpage.

As illustrated in FIG. 13C again, when drag or flicking is applied to the photo, information associated with the photo may be displayed on the photo image. In this case, specific information associated with the photo may be displayed while turning over the photo image or overlapping it with the photo image. In this manner, when a touch input is applied to the photo image, an execution screen, namely, webpage, on which specific information has been previously displayed by applying a touch input, may be in a state in which the output of the specific information is maintained.

Furthermore, according to the present disclosure, the description thereof can be modified. For such an example, when drag or flicking is applied to the flexible display unit 151 in the configuration of FIG. 13A, all the specific information of execution screens may be displayed. In other words, when a touch input moving in one direction to part of a plurality of execution screens displayed in the second configuration, specific information may be displayed on virtual layers 261, 262, 263 corresponding to the plurality of execution screens, respectively.

FIG. 14 is a conceptual view for explaining a control method using the warpage and touch input of a flexible display unit in a mobile terminal according to still another embodiment of the present disclosure.

According to the drawing, the virtual layers 261, 262, 263 are formed to be inclined to the flexible display unit 151, and the degree of inclination is changed using the moving direction of a touch input moving in one direction.

For example, referring to FIG. 14A, execution screens are all displayed in an inclined shape in the second configuration. According to the present embodiment, execution screens may be webpages, photo images, and music control screens. In this configuration, when a touch input moving one direction, for example, drag or flicking, is applied to the flexible display unit 151 as illustrated in FIG. 14B, the size of the execution screens is changed while varying the degree of inclination of the execution screens. When drag or flicking is advanced in the left direction, the inclination and size of execution screens are changed while rotating the execution screens in a counter clockwise direction. On the contrary, when drag or flicking is advanced in the right direction, the inclination and size of execution screens are changed while rotating the execution screens in a clockwise direction.

Furthermore, according to the present disclosure, there is presented an example in which the flexible display unit is divided into a plurality of regions. Hereinafter, the foregoing example will be described in more detail.

Figure 15:
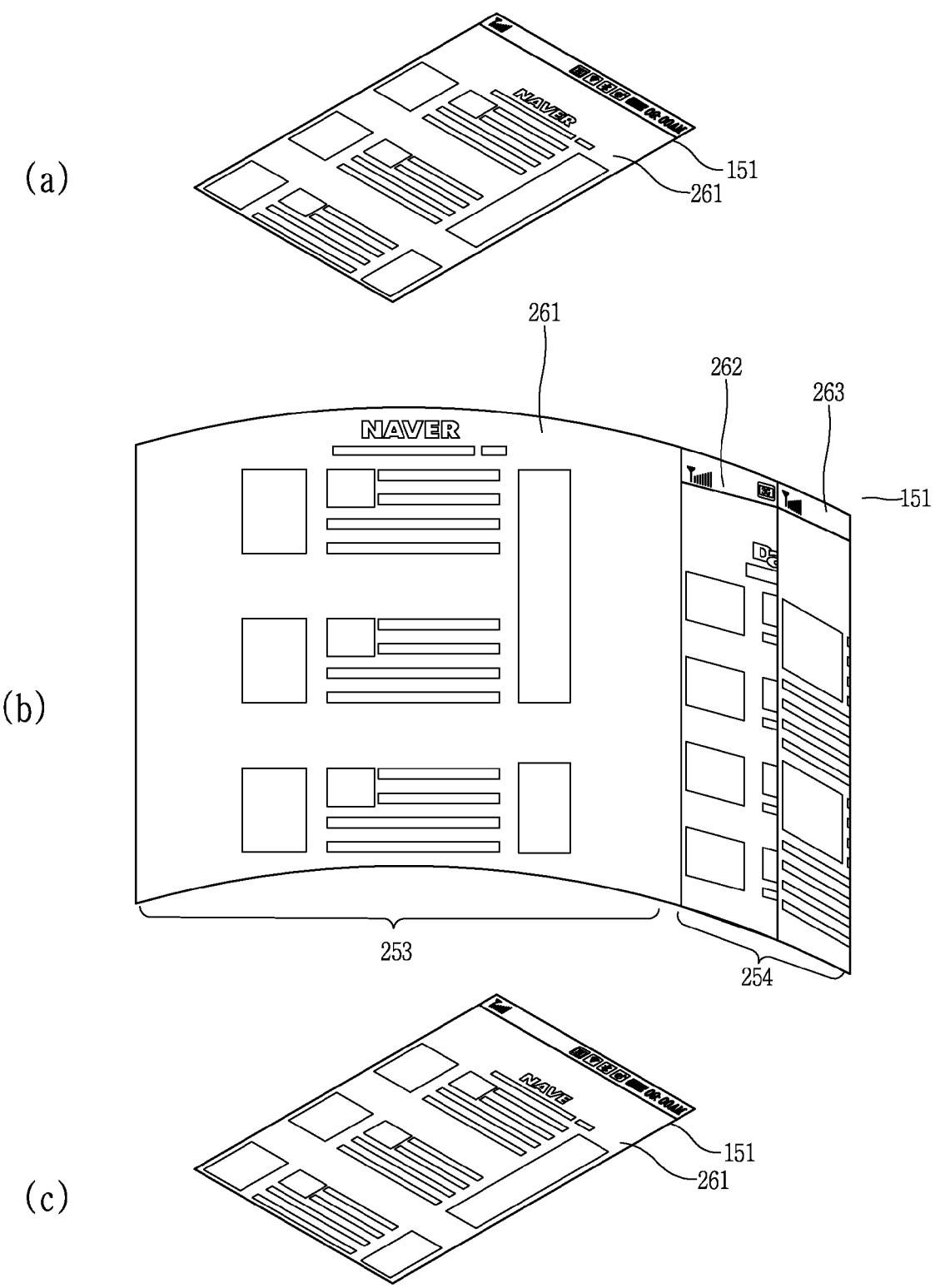
FIG. 15 is a conceptual view for explaining a control method using the warpage characteristic of a flexible display unit in a mobile terminal according to still another embodiment of the present disclosure.

FIG. 15 is a conceptual view for explaining a control method using the warpage characteristic of a flexible display unit in a mobile terminal according to still another embodiment of the present disclosure.

Referring to the drawing, a single execution screen is displayed on a flexible display unit in the first configuration, and the flexible display unit is divided into a plurality of regions, and a plurality of execution screens are displayed in the plurality of regions, respectively. More specifically, the plurality of regions may include a central region 253 and an edge region 254 on the flexible display unit, and an execution screen of an application driven in the first configuration is displayed in the central region 253, and execution screens different from the execution screen is displayed in the edge region 254.

Here, at least part of the different execution screens are displayed or representative information (for example, application names) representing the different execution screens may be displayed in the edge region 254. Furthermore, the edge region 254 may be displayed as representative colors representing applications corresponding to the different execution screens, respectively.

For example, as illustrated in FIG. 15A, a first webpage displayed by driving a web browser in the first configuration is displayed on the flexible display unit 151. When the user applies an external force to the mobile terminal, flexible display unit is converted into the second configuration while being warped.

Referring to FIG. 15B, the execution screens of the web browser corresponding to the first through the third virtual layers 261, 262, 263 are displayed on the flexible display unit 151 in the second configuration. For example, the flexible display unit 151 is divided into a plurality of regions corresponding to the virtual layers 261, 262, 263. More specifically, a first through a third webpage are displayed in the plurality of regions, respectively, on the flexible display unit 151, and the plurality of regions are brought into contact with the adjoining regions to fill all the display regions of the flexible display unit.

According to the drawing, the central region 253 occupies most of the flexible display unit 151, and formed with a larger area than that of the edge region 254. In this case, the uppermost layer, for example, a first virtual layer 261 corresponding to the first webpage, may be disposed in the central region 253 of the flexible display unit, and lower layers, for example, a second and a third layer 262, 263 corresponding to the second and the third webpage, may be disposed in the edge region thereof.

Referring to FIG. 15C, when the external force applied to the mobile terminal is removed in the second configuration, the flexible display unit 151 is restored to the first configuration again. At this time, the first webpage that has been displayed in the central region of the flexible display unit 151 in the second configuration may be individually displayed in the first configuration. The individually displayed object may be specified by the user.

For example, any one of the first through the third webpage (for example, second webpage) is touched in the second configuration and then converted into is the first configuration, the touched webpage (for example, second webpage) in the first configuration is individually displayed.

Figure 16:
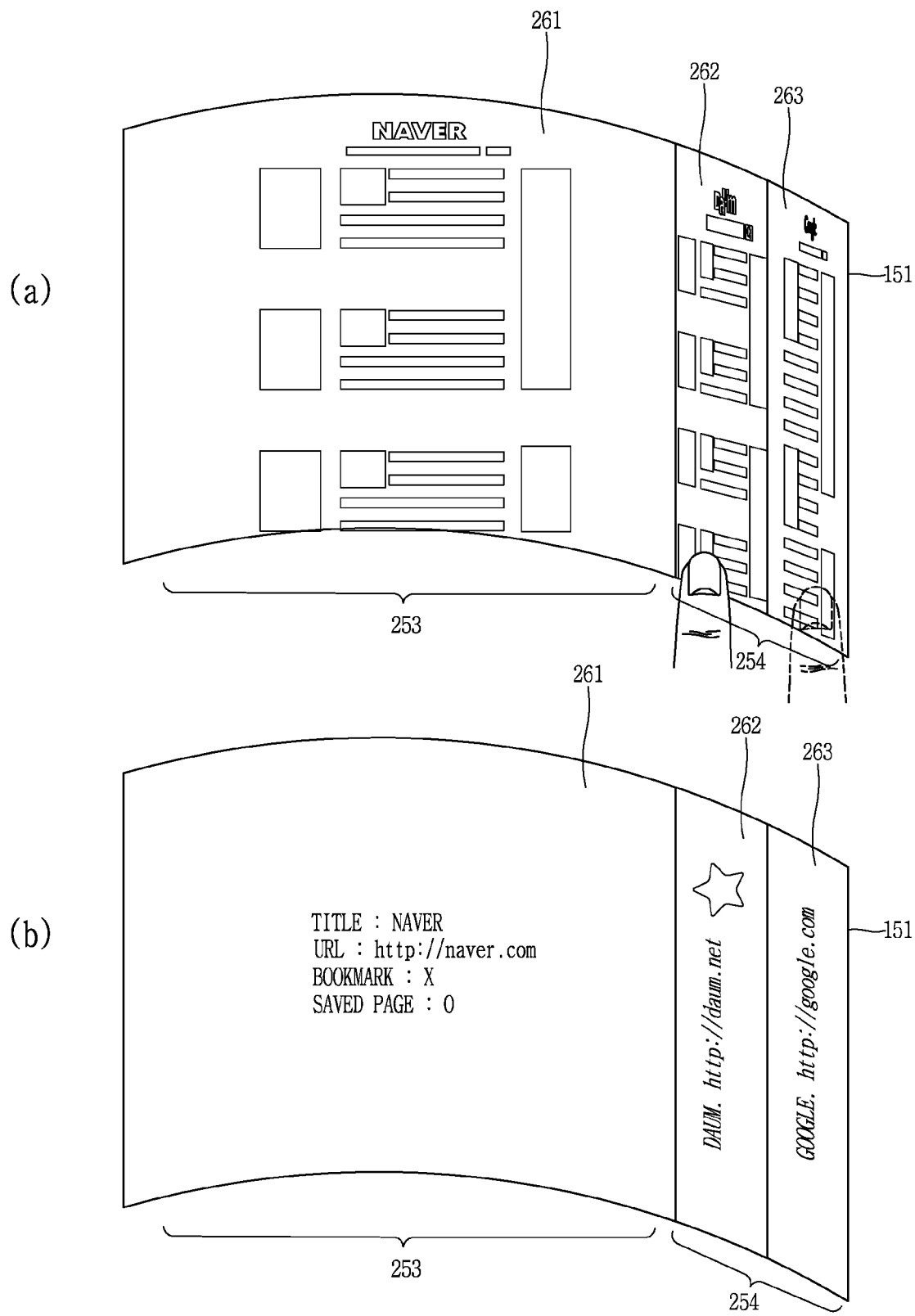

FIGS. 16 through 18 are conceptual views for explaining a control method using the warpage and touch input of a flexible display unit in a mobile terminal according to still another embodiment of the present disclosure.

As illustrated in the drawing, when the flexible display unit 151 is divided into the central region 253 and edge region 254 and then a touch input moving in one direction is applied to the edge region 254, information associated with the execution screens of applications is displayed in at least one of the central region 253 and edge region 254.

For example, as illustrated in FIG. 16A, a first webpage is displayed in the central region 253 in the second configuration, and a second and a third webpage are displayed in the edge region 254. In this state, when a touch input (for example, drag, flicking or the like) moving in one direction is applied to the edge region 254 in the edge region, an icon 252 indicating a bookmarked page is displayed or the address of each page may be displayed on the webpages. In other words, specific information associated with the webpage is displayed in response to a touch input to the edge region.

However, the present disclosure may not be necessarily limited to this, a touch input for displaying the specific information may be defined in various forms. First, the type of touch input may include a long touch, a short touch or the like in addition to the moving touch input. An object to which the touch is applied may be expanded to a central region such as a touch successively being carried out from the edge region to the central region.

FIG. 17 is a view illustrating a case where photo images are displayed in each region. For example, the photo images may be sequentially displayed, and the sequence may be determined in the order of storing the photo images.

More specifically, a photo image is displayed in the central region 253, and an image next to the photo image is displayed in the edge region 254. In this state, as illustrated in the drawing, when a touch input moving in one direction is applied to the edge region 254, information associated with the photo may be displayed in the photo image. In this case, specific information associated with the photo may be displayed while turning over the photo image.

However, the present disclosure may not be necessarily limited to this, and specific information may be additionally displayed to be overlapped with a photo while maintaining the display of the photo image similarly to the webpage. The specific information may be information such as title, place, date and the like, or may be information entered by the user.

For another example, the output of specific information associated with the photo image may be sequentially carried out. As illustrated in FIG. 17A, when a drag input is started from the third image and applied to the second image, the specific information of the third image may be first displayed, and then the specific information of the second image may be displayed. In this case, when the drag input reaches the first image, the specific information of the first image is displayed. Here, the first image is an image displayed in the central region, and the second and the third image are images corresponding to the sequence of moving from the central region to the edge region.

FIG. 18 is a view illustrating a case where the execution screens of a plurality of applications are respectively displayed in each region. For example, a webpage is displayed in the central region 253, and a photo image is displayed in part of the edge region 254, and a music control screen is displayed in another part thereof. In this configuration, as illustrated in the drawing, when a touch input moving in one direction is applied to the edge region 254, information associated with the execution screen is displayed on virtual layers 261, 262, 263 in which the execution screens have been displayed in the second configuration.

However, the present disclosure may not be necessarily limited to this, and for example, when a touch is applied to each execution screen, information associated with the execution screen to which the touch is applied may be displayed.

For a more specific example, specific information such as memory usage, use time and the like may be displayed on the webpage. For another example, specific information associated with the photo may be displayed on the photo image. The specific information may be information such as title, place, date and the like, or may be information entered by the user. For still another example, a music control screen may be converted into specific information on a music file currently being played, which is music subject to control.

As described above, a mobile terminal according to the present disclosure may generate a new control command using the warpage, inclination and touch input of a flexible display unit. Accordingly, the user may receive multiple information using the warpage, inclination and touch input of the flexible display unit.

Furthermore, a mobile terminal according to an embodiment of the present disclosure may perform a control command for changing the number of information displayed on a flexible display unit using the warpage characteristic of the flexible display unit. Accordingly, the user may easily select displayed information using an external force being applied to or not applied to the flexible display unit.

Furthermore, a mobile terminal according to the present disclosure may control the number of applications driven on one screen using the warpage of the flexible display unit. Accordingly, the user may use screen information corresponding to a plurality of application through one screen, thereby efficiently using a display space having a restricted size.

Furthermore, a mobile terminal according to the present disclosure may generate a new control command using the warpage and inclination of the flexible display unit. Accordingly, the user can easily use a function carried out by the warpage and its successive function.

Furthermore, according to an embodiment disclosed in the present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal comprising:
a flexible display configured to be warped by an external force between a first configuration having a first radius of curvature and a second configuration having a second radius of curvature different from the first radius of curvature;
a sensor configured to sense a warpage of the flexible display; and
a controller configured to
display first screen information in the first configuration, and
display a first image object corresponding to the first screen information when the flexible display is warped from the first configuration to the second configuration,
wherein, when a second application different from an application corresponding to the first screen information is driven, a second image object corresponding to the second application is displayed, along with the first image object, in the second configuration, and
wherein, when the flexible display is warped again from the second configuration to the first configuration, screen information corresponding to at least part of the first image object and the second image object is displayed.

2. The mobile terminal of claim 1,
wherein the first screen information is screen information contained in a first layer, and the second image object corresponds to second screen information contained in a second layer different from the first layer, and
wherein the first screen information and the second screen information are formed of application execution screens.

3. The mobile terminal of claim 2,
wherein, when a plurality of applications are driven on the first layer, the screen information contained in the first layer comprises execution screens corresponding to the plurality of applications, respectively, and
wherein, when a degree of the warpage of the flexible display is out of a reference range in the second configuration, the controller drives at least one of the plurality of applications driven on the first layer onto a layer different from the first layer.

4. The mobile terminal of claim 3, wherein, when two applications of the plurality of applications are driven on the first layer and the degree of the warpage of the flexible display is out of the reference range, the controller
drives a first application of two applications on the first layer, and drives a second application of the two applications on a third layer different from the first layer and the second layer.

5. The mobile terminal of claim 4, wherein a third image object corresponding to the third layer is further displayed along with the first image object and the second image object on the flexible display.

6. The mobile terminal of claim 5, wherein, when the third image object is selected, screen information of the third layer corresponding to the third image object is displayed on the flexible display.

7. The mobile terminal of claim 4, wherein, when the degree of the warpage of the flexible display is out of the reference range and then is restored to within the reference range, the third layer disappears and the first and second applications of the two applications are driven again on the first layer.

8. The mobile terminal of claim 1, wherein, when either one of the first image object and the second image object is moved to another one of the first image object and the second image object based on a touch applied to the flexible display, applications corresponding to the first image object and the second image object, respectively, are driven on a common layer.

9. The mobile terminal of claim 8, wherein a third image object corresponding to the common layer is displayed instead of the first image object and the second image object.

10. The mobile terminal of claim 9, wherein the common layer is displayed on the flexible display in response to the third image object being selected or in response to the flexible display being warped again to the first configuration, the common layer comprising application execution screens corresponding to the first image object and the second image object, respectively.

11. The mobile terminal of claim 1, wherein the first configuration is a configuration in which a display area of the flexible display is a planar surface, and the second configuration is a configuration in which the display area is a curved surface.

12. The mobile terminal of claim 1, wherein, when the flexible display is warped again to the first configuration based on a touch to either one of the first image object and the second image object, the controller displays screen information corresponding to an applied corresponding image object touch.

13. A mobile terminal comprising:
a flexible display configured to be warped by an external force between a first configuration having a first radius of curvature and a second configuration having a second radius of curvature different from the first radius of curvature;
a sensor configured to sense a warpage of the flexible display; and
a controller configured to
display first screen information in the first configuration, and
display second screen information along with the first screen information when the flexible display is warped from the first configuration to the second configuration,
wherein, when the flexible display is warped again from the second configuration to the first configuration, screen information corresponding to at least part of the first screen information and the second screen information is displayed.

14. The mobile terminal of claim 13,
wherein, when the flexible display is warped from the first configuration to the second configuration, the first screen information and the second screen information are displayed in an overlapped manner, and
wherein either one of the first screen information or the second screen information is formed in an identifiable manner when the first screen information and the second screen information are overlapped.

15. The mobile terminal of claim 14,
wherein the first screen information is screen information contained in a first layer, and the second screen information is screen information contained in a second layer different from the first layer, and
wherein one of the first layer or the second layer is formed to cover another of the first layer or the second layer.

16. The mobile terminal of claim 15, wherein, when a degree of warpage of the flexible display is out of a reference range in the second configuration, a layer located at an upper end of the first layer and the second layer is relocated to a lower layer thereof.

17. The mobile terminal of claim 16, wherein, when the flexible display is warped again from the second configuration to the first configuration, the controller displays screen information corresponding to the layer located at an upper end of the first layer and the second layer in response to.

18. The mobile terminal of claim 13, wherein, in the second configuration, the flexible display is divided into a plurality of regions to display the first screen information and the second screen information at the same time.

19. The mobile terminal of claim 18, wherein the first screen information and the second screen information are reduced to be displayed in the plurality of regions, respectively.

20. A mobile terminal comprising:
a flexible display configured to be warped by an external force between a first configuration having a first radius of curvature and a second configuration having a second radius of curvature different from the first radius of curvature;
a sensor configured to sense a warpage of the flexible display; and
a controller configured to
display the execution screen of an application on the flexible display in the first configuration, and
display another execution screen along with the execution screen on the flexible display when the flexible display is warped from the first configuration to the second configuration.

21. The mobile terminal of claim 20, wherein a single execution screen is displayed in the first configuration, and a plurality of execution screens are displayed in the second configuration.

22. The mobile terminal of claim 21, wherein the first configuration is a configuration in which a display area of the flexible display is a planar surface, and the second configuration is a configuration in which the display area thereof is a curved surface.

23. The mobile terminal of claim 20, wherein an execution screen displayed in the first configuration is formed in parallel to the flexible display, and a plurality of execution screens displayed in the second configuration are formed to be inclined with respect to the flexible display.

24. The mobile terminal of claim 23, wherein boundary lines of the plurality of execution screens, respectively, displayed in the second configuration are separated from one another.

25. The mobile terminal of claim 20,
wherein the sensor is configured to sense an inclination of the flexible display, and
wherein an execution screen size in the second configuration is changed when the flexible display is inclined.

26. The mobile terminal of claim 25, wherein an extent of execution screen size changes varies according to a degree of the inclination of the flexible display.

27. The mobile terminal of claim 25, wherein an execution screen size change is carried out in connection with a change of a degree of inclination of the flexible display.

28. The mobile terminal of claim 20,
wherein the sensor is configured to sense an inclination of the flexible display, and
wherein displayed second configuration execution screens are changed to different shapes according to a direction of the inclination when the flexible display is inclined in the second configuration.

29. The mobile terminal of claim 28,
wherein an execution screen size is changed when the flexible display is inclined in a first direction, and
wherein execution screen information is displayed on virtual layers of the flexible display when the flexible display is inclined in a second direction which is an opposite to the first direction.

30. The mobile terminal of claim 20, wherein, when a touch input moving in one direction is applied to second configuration execution screens displayed in the, information associated with a touched second configuration execution screen is displayed on a virtual layer.

31. The mobile terminal of claim 30, wherein the virtual layer is formed to be inclined with respect to the flexible display wherein a degree of inclination of the virtual screen is changeable via the touch input.

32. The mobile terminal of claim 20, wherein the execution screen displayed in the first configuration is a single execution screen displayed in a first region of a plurality of regions of the flexible display, and the another execution screen displayed in the second configuration includes one or more other execution screens displayed in one or more other regions of the plurality of regions of the flexible display.

33. The mobile terminal of claim 32,
wherein the first region comprises a central region of the flexible display and the one or more other regions comprise an edge region of the flexible display.

34. The mobile terminal of claim 33, wherein, when a touch input moving in one direction is applied to the edge region, execution screen information is displayed in at least one of the central region and edge region.

35. The mobile terminal of claim 33, wherein a photo image is displayed in the central region, and an image next to the photo image is displayed in the edge region.

* * * * *